Sept. 6, 1938.  M. E. LANGE ET AL  2,129,280
MACHINE TOOL
Filed April 8, 1935   9 Sheets-Sheet 2
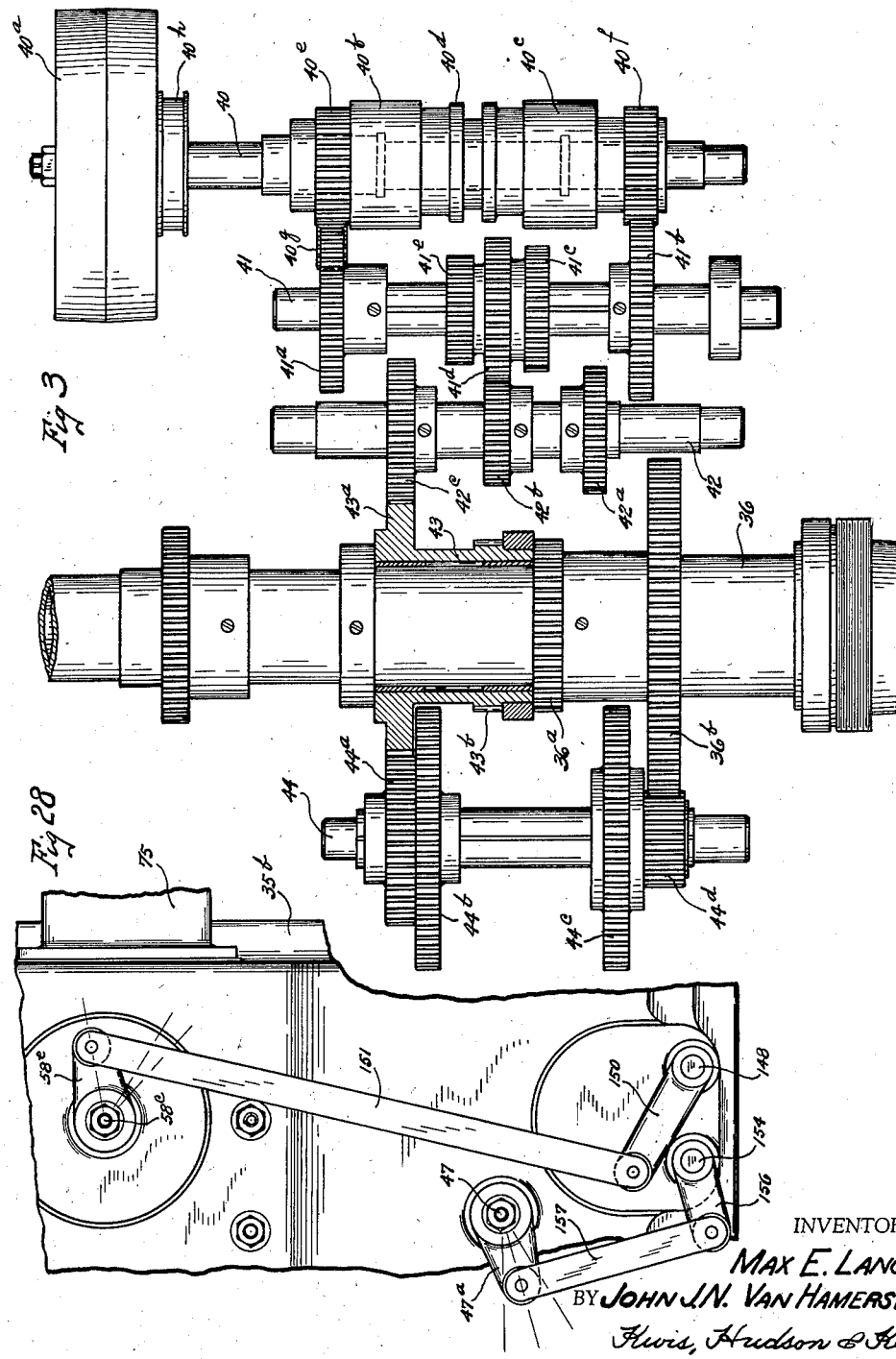
INVENTORS
MAX E. LANGE
BY JOHN J.N. VAN HAMERSVELD
Huris, Hudson & Kent
ATTORNEYS.

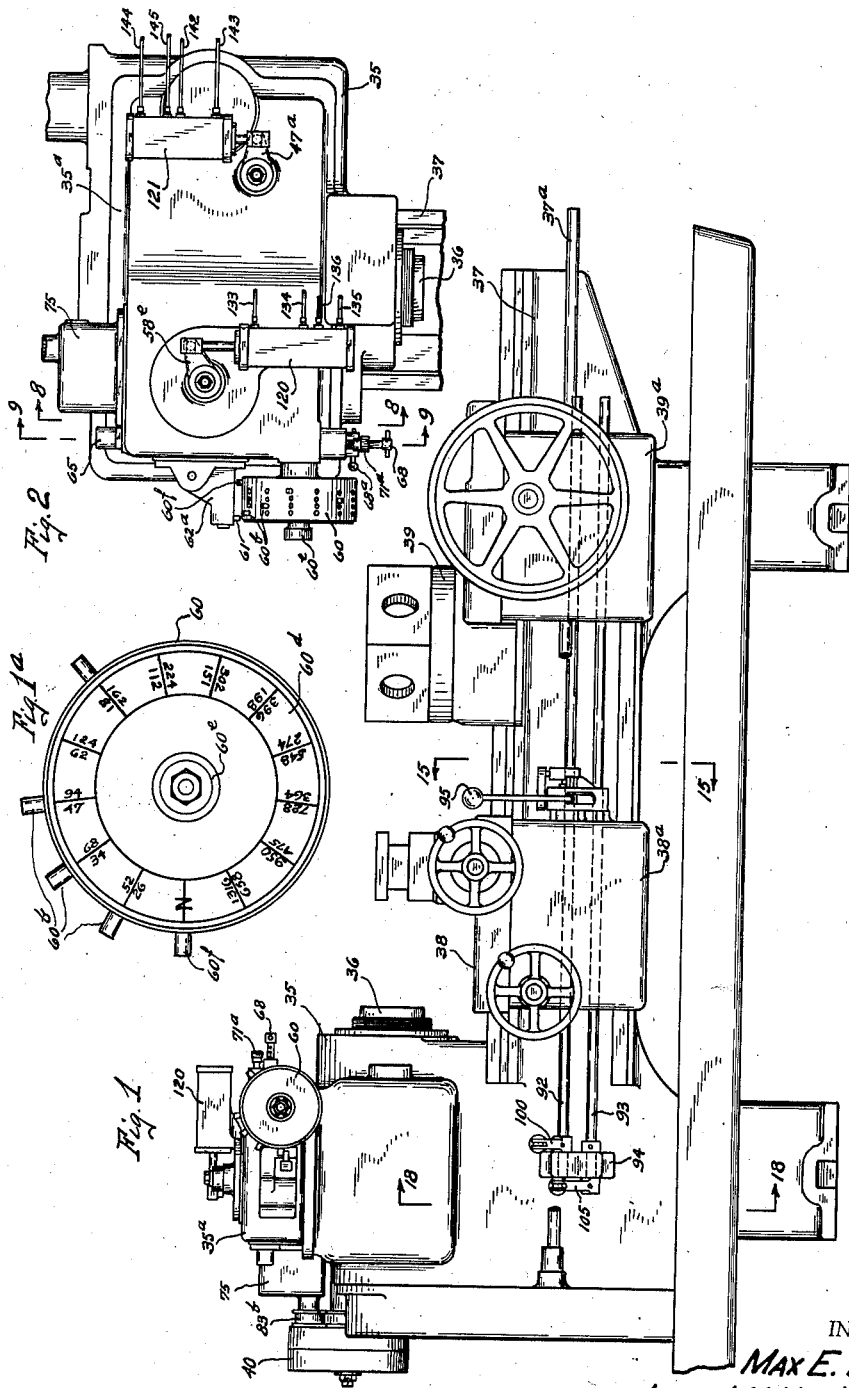

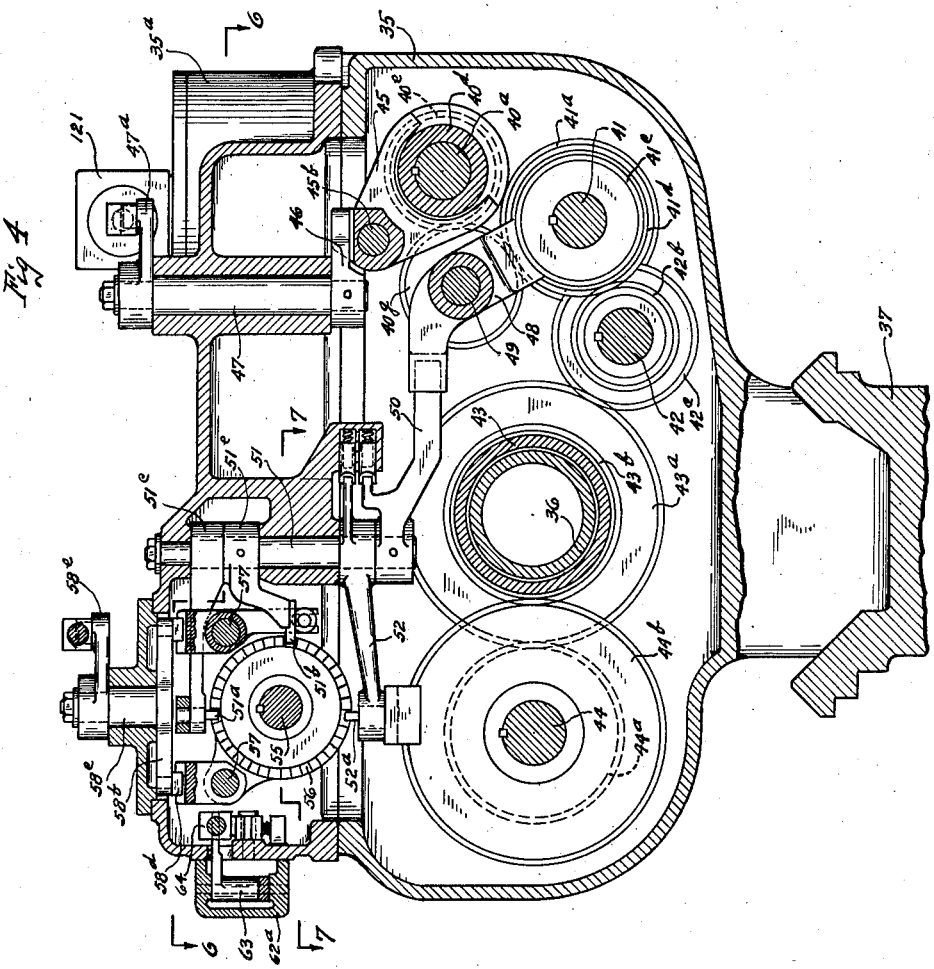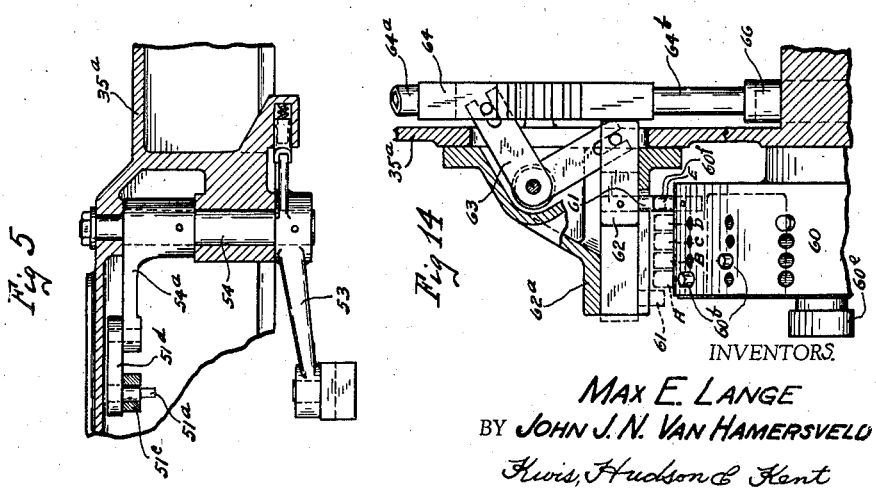
INVENTORS.
MAX E. LANGE
BY JOHN J. N. VAN HAMERSVELD
Lewis, Hudson & Kent
ATTORNEYS.

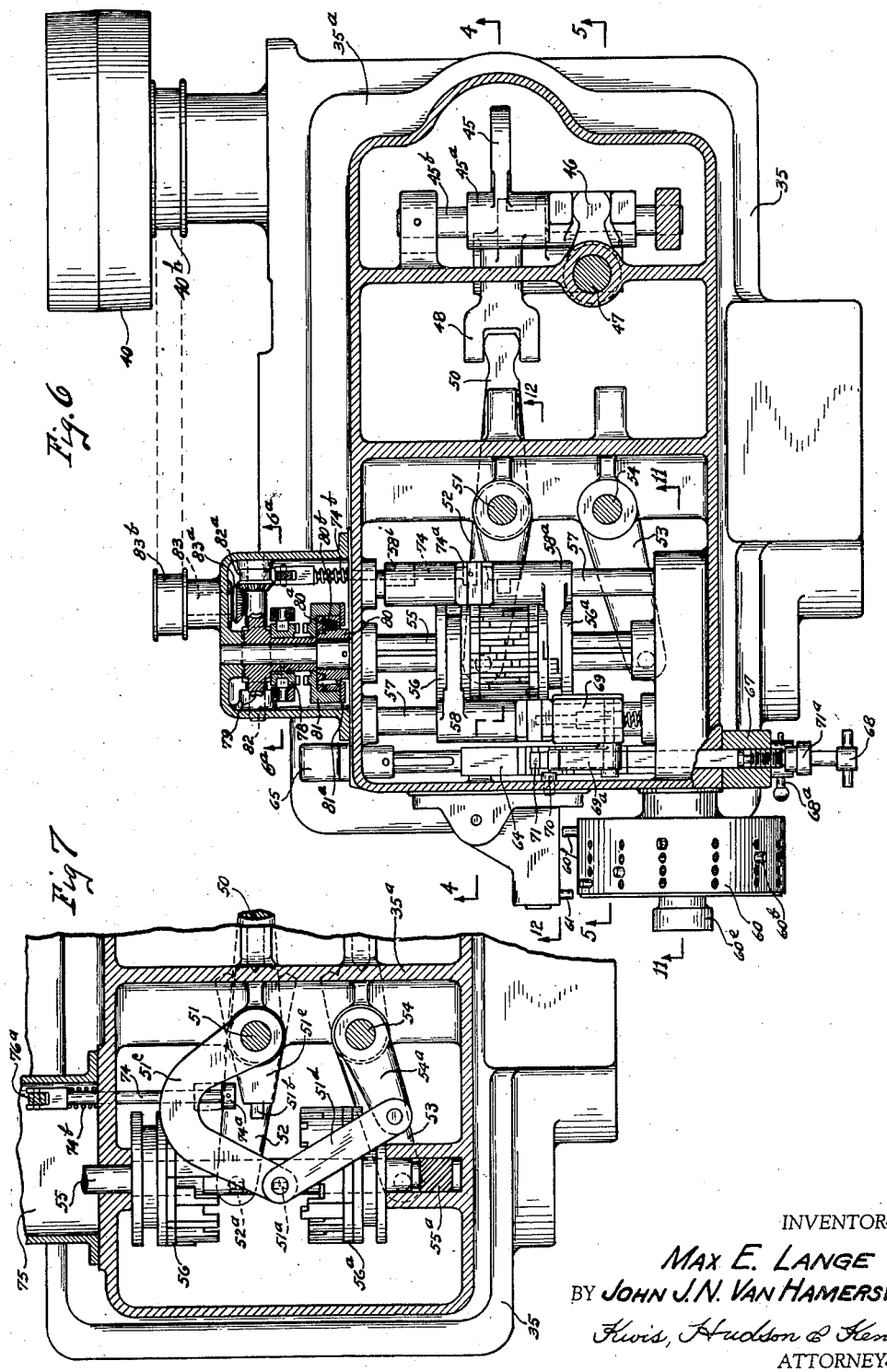

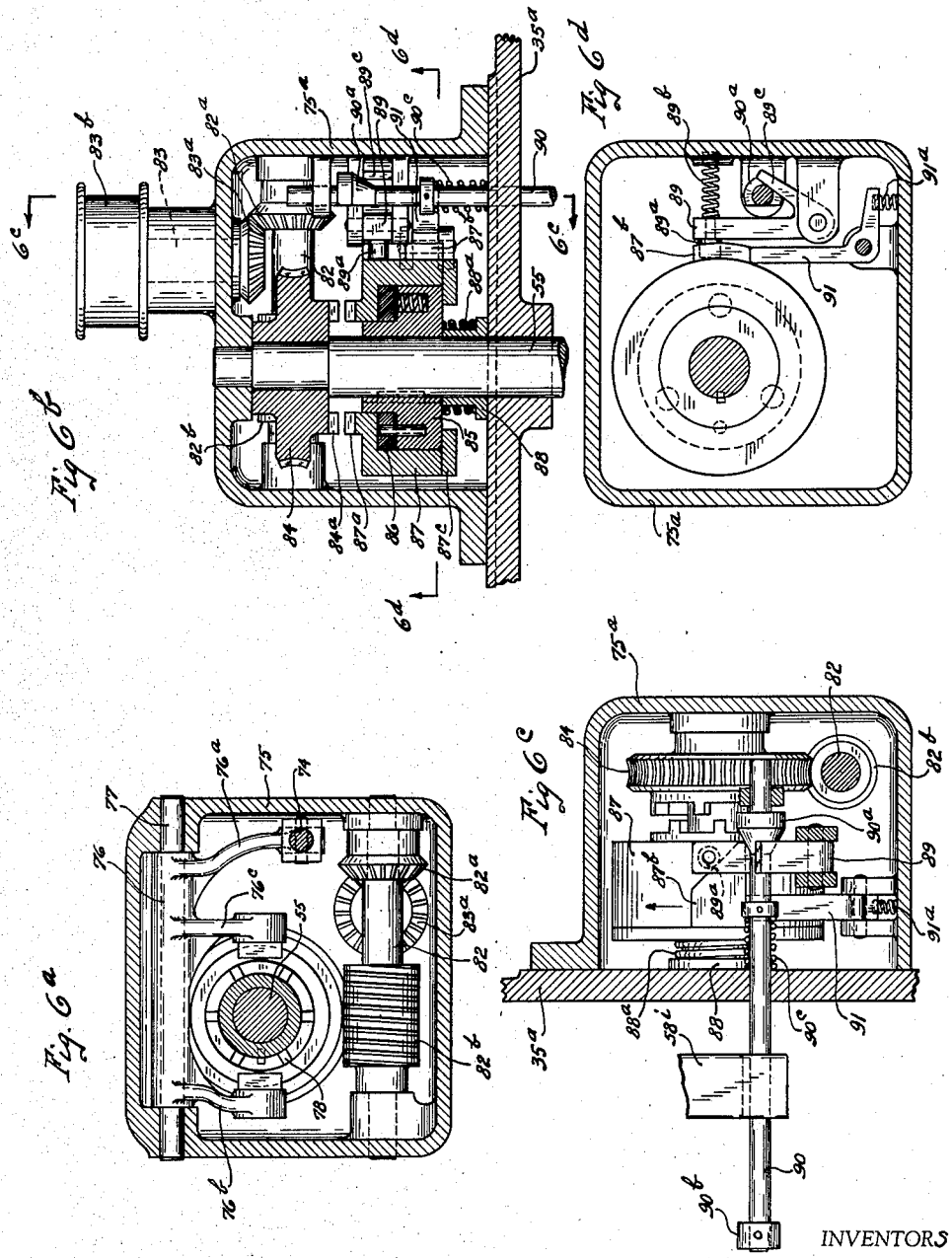

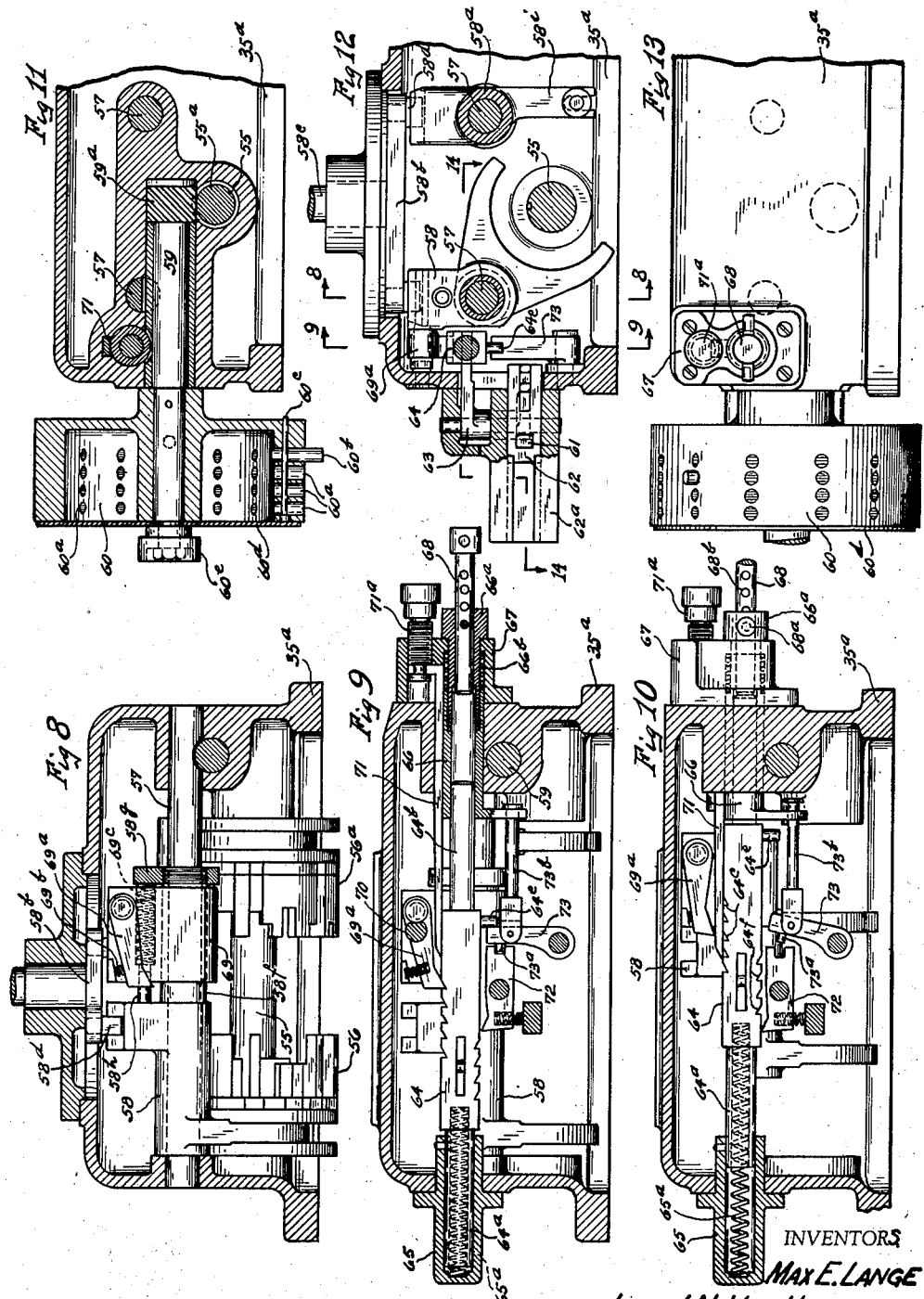

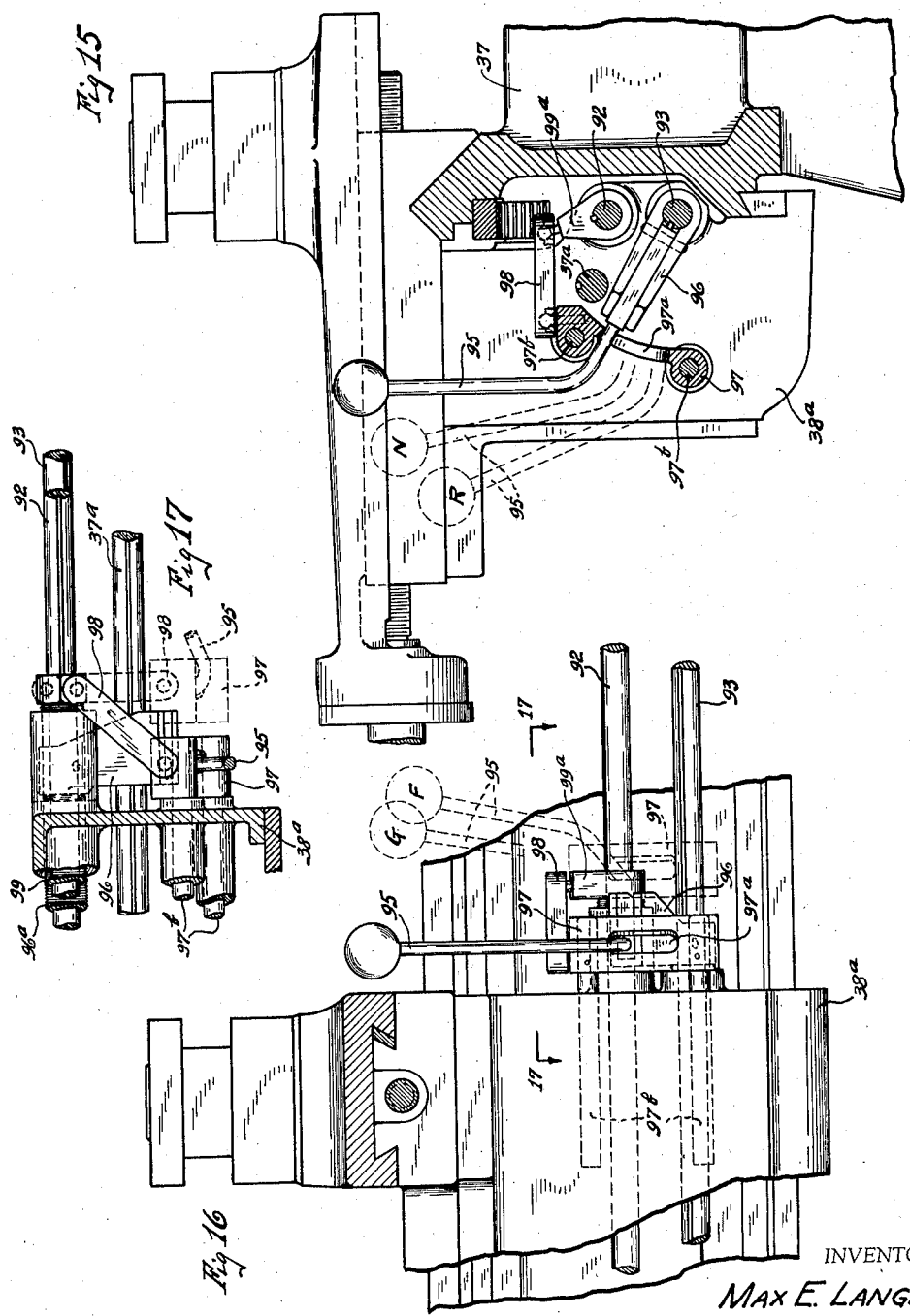

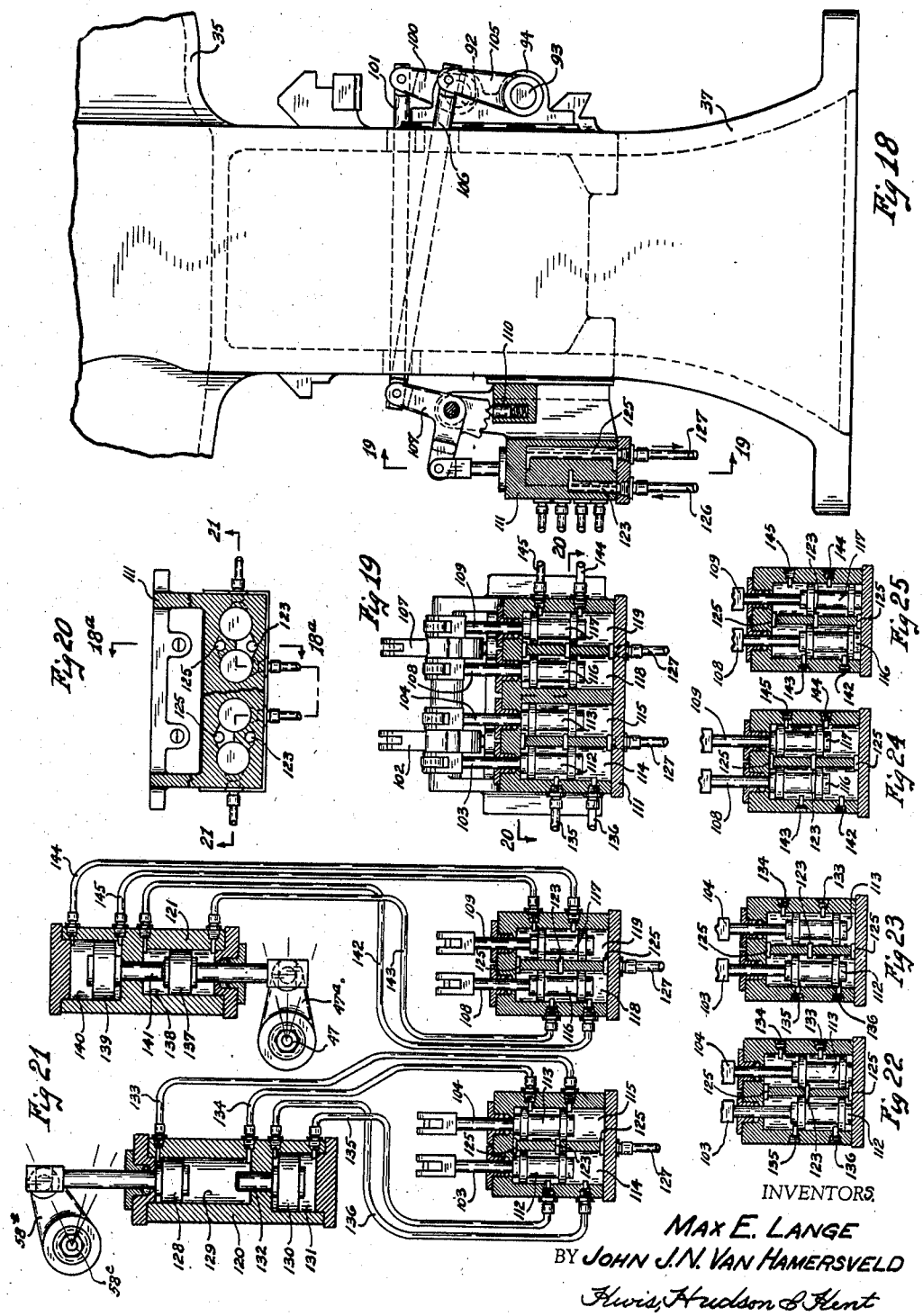

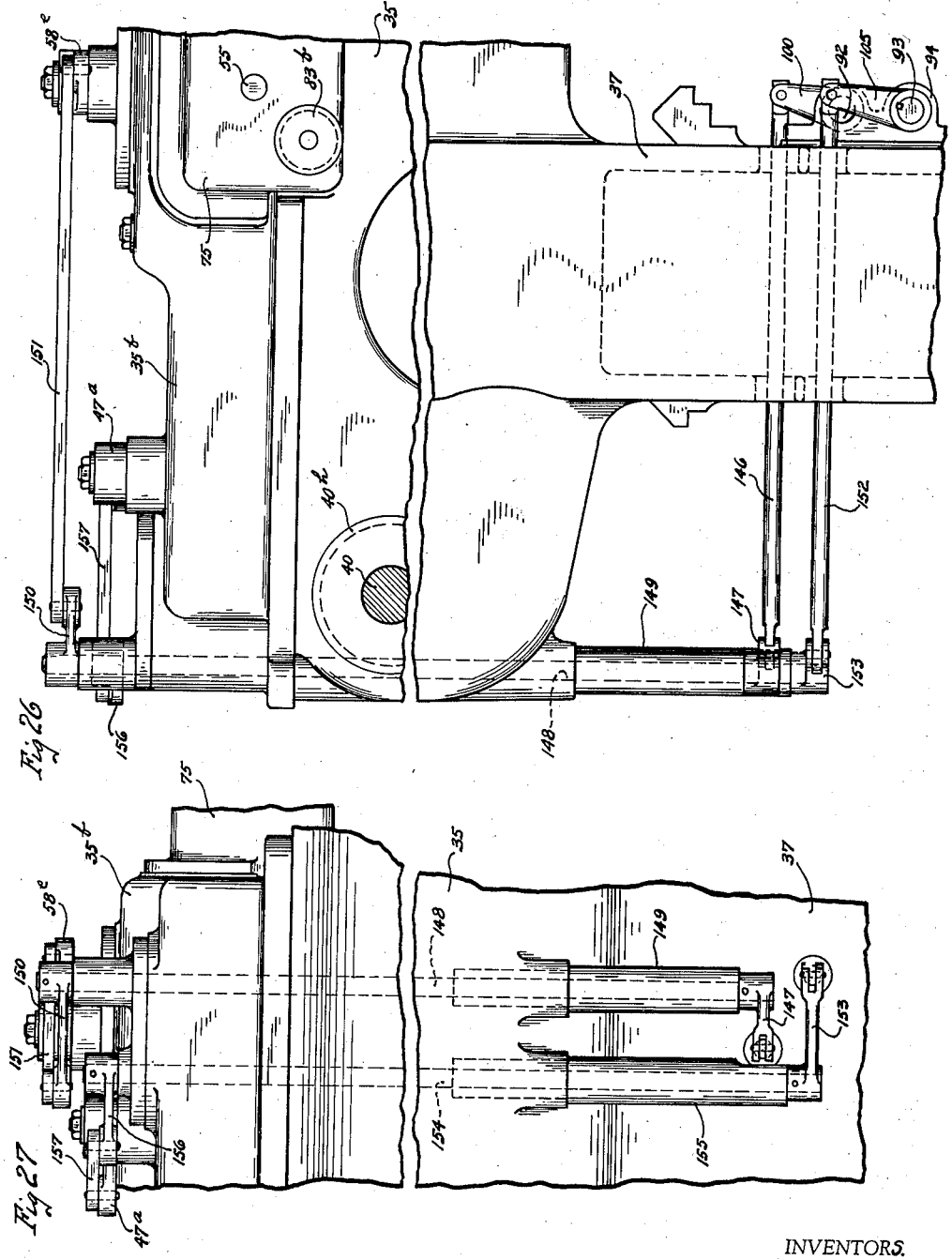

Patented Sept. 6, 1938

2,129,280

UNITED STATES PATENT OFFICE 2,129,280

MACHINE TOOL

Max E. Lange and John J. N. Van Hamersveld, Cleveland Heights, Ohio, assignors to The Warner & Swasey Company, Cleveland, Ohio, a corporation of Ohio Application April 8, 1935, Serial No. 15,182

REISSUED
FEB 6 - 1940

67 Claims. (Cl. 29—46)

This invention relates to a machine tool and more particularly although not necessarily to machine tools of the larger types, wherein the operator cannot conveniently and efficiently control the machine from the position he occupies while controlling the slides and observing the operation of the machine.

An object of the invention is to provide in a machine tool means for preselecting the speeds of operation of a movable part thereof and which means is operated from a point remotely arranged with respect to said part.

Another object is to provide in a machine tool means for preselecting the speeds of operation of a movable part thereof, and which means is operated by a single control member remotely arranged with respect to said part.

Another object is to provide in a machine tool means for preselecting and changing the speeds of operation of a movable part thereof and controlled by means remotely arranged with respect to said part.

Another object is to provide in a machine tool means for preselecting and changing the speeds of operation and for controlling the starting, stopping and reversing of a movable part of the machine and controlled by means remotely arranged with respect to said part.

Another object is to provide in a machine tool means for preselecting and changing the speeds of operation and for controlling the starting, stopping and reversing of a movable part of the machine and controlled by a single control member remotely arranged with respect to said part.

Another object is to provide in a machine tool means for preselecting the speeds of operation of one movable part thereof and which means is operated from a point located on another movable part of the machine.

A further object is to provide in a machine tool means for preselecting and changing the speeds of operation of a movable part of the machine and controlled by means arranged on another movable part of the machine.

A still further object is to provide in a machine tool means for preselecting and changing the speeds of operation and for controlling the starting, stopping and reversing of a movable part of the machine and controlled by a single control member arranged on another movable part of the machine.

Another object is to provide in a machine tool hydraulic means for preselecting and changing the speeds of operation of a movable part of the machine and controlled by means arranged on another movable part of the machine.

Another object is to provide in a machine tool hydraulic means for preselecting and changing the speeds of operation and for controlling the starting, stopping and reversing of a movable part of the machine and controlled by means arranged on another movable part of the machine.

Another object is to provide in a machine tool hydraulic means for preselecting and changing the speeds of operation and for controlling the starting, stopping and reversing of a movable part of the machine and controlled by means remotely arranged with respect to said part.

Another object is to provide in a machine tool mechanical means for preselecting and changing the speeds of operation and for controlling the starting, stopping and reversing of a movable part of the machine and controlled by means arranged on another movable part of the machine.

A further object is to provide in a machine tool means for preselecting and changing the speeds of operation of a movable part thereof, and including a fluid motor having a plurality of pistons together with control valves for said motor, whereby said pistons may be operated in unison or independently of each other.

A still further object is to provide in a machine tool means for preselecting and changing the speeds of operation of a movable part thereof and for disconnecting said part from its drive and including a movable member having an indexing movement, and means for stopping said movement in predetermined positions of said member.

Further and additional objects and advantages not hereinbefore specifically referred to will become apparent hereinafter during the detailed description which is to follow of several embodiments of the invention.

Referring to the accompanying drawings illustrating several embodiments of the invention, Fig. 1 is a front elevational view of a machine tool with an embodiment of the invention applied thereto.

Fig. 1ª is a detached front face view of the dial shown in Fig. 1.

Fig. 2 is a fragmentary top plan view of a portion of the machine tool shown in Fig. 1.

Fig. 3 is a developed view of the gearing and work spindle in the head of the machine tool shown in Fig. 1.

Fig. 4 is an enlarged transverse sectional view through the head of the machine tool shown in Fig. 1 and is taken substantially on line 4—4 of Fig. 6, looking in the direction of the arrows.

Fig. 5 is a fragmentary sectional view taken substantially on line 5—5 of Fig. 6 looking in the direction of the arrows.

Fig. 6 is a horizontal sectional view taken substantially on line 6—6 of Fig. 4 looking in the direction of the arrows.

Fig. 6a is a sectional view, on an enlarged scale, taken substantially on line 6a—6a of Fig. 6, looking in the direction of the arrows.

Fig. 6b is a modification of the clutch and housing shown in Fig. 6 and is on an enlarged scale.

Figs. 6c and 6d are sectional views taken, respectively, on lines 6c—6c and 6d—6d of Fig. 6b, looking in the direction of the arrows.

Fig. 7 is a fragmentary horizontal sectional view taken substantially on the line 7—7 of Fig. 4, looking in the direction of the arrows.

Fig. 8 is a sectional view on an enlarged scale taken substantially on line 8—8 of Figs. 2 and 12 looking in the direction of the arrows.

Fig. 9 is a sectional view on an enlarged scale taken substantially on line 9—9 of Figs. 2 and 12 looking in the direction of the arrows.

Fig. 10 is a view similar to Fig. 9 but showing certain of the parts in different positions.

Fig. 11 is a sectional view taken substantially on line 11—11 of Fig. 6 looking in the direction of the arrows.

Fig. 12 is a sectional view taken substantially on line 12—12 of Fig. 6 looking in the direction of the arrows.

Fig. 13 is a fragmentary end elevation of the head of the machine shown in Fig. 1 and is taken looking from the right hand side of said view.

Fig. 14 is a sectional view taken substantially on line 14—14 of Fig. 12 looking in the direction of the arrows.

Fig. 15 is a fragmentary transverse sectional view taken substantially on line 15—15 of Fig. 1 looking in the direction of the arrows.

Fig. 16 is a fragmentary front elevation on an enlarged scale of a portion of the machine tool shown in Fig. 1.

Fig. 17 is a fragmentary sectional view taken substantially on line 17—17 of Fig. 16 looking in the direction of the arrows.

Fig. 18 is a fragmentary sectional view on an enlarged scale and is taken substantially on line 18—18 of Fig. 1, a portion of the machine in this view being illustrated in section taken substantially on line 18a—18a of Fig. 20, looking in the direction of the arrows.

Fig. 19 is a sectional view of a portion shown in Fig. 18, and is taken substantially on line 19—19 of Fig. 18 looking in the direction of the arrows.

Fig. 20 is a sectional view taken substantially on line 20—20 of Fig. 19 looking in the direction of the arrows.

Fig. 21 is a diagrammatic view of the fluid motors and the control valves therefor with the latter being shown in section taken substantially on line 21—21 of Fig. 20, the motors also being shown in section and in the same relative positions as shown in Fig. 2.

Fig. 22 is a sectional view of the left hand control valves unit shown in Fig. 21 with the parts thereof shown in a different position than in said Fig. 21.

Fig. 23 is a view similar to Fig. 22, with the parts of the valves unit shown in a still different position.

Fig. 24 is a sectional view of the control valves unit shown at the right of Fig. 21 with the parts of the valves unit in a different position than in said Fig. 21.

Fig. 25 is a view similar to Fig. 24 with the parts of the valves unit in a still different position.

Fig. 26 is a view similar to Fig. 18, but illustrates a modified embodiment of the invention from that previously illustrated.

Fig. 27 is a fragmentary side elevational view looking from the left hand side of Fig. 26, and Fig. 28 is a fragmentary top plan view of Figs. 26 and 27.

The machine tool shown in Fig. 1 comprises a head 35 in which is arranged a rotatable work spindle 36, while horizontal ways 37 extend from the head along the bed of the machine and have, in this instance, two movable parts 38 and 39 arranged thereon, said parts constituting a cross-slide and a turret slide.

The work spindle 36 in the head 35 may be driven from a suitable high and low speed motor (not shown) through a pulley 40a which is operatively connected with the spindle by means of clutches and speed change gears now to be described.

Referring to Fig. 3 it will be seen that the pulley 40a is mounted on a shaft 40, rotatably arranged in the head 35 and carrying freely rotatable friction clutch members 40b and 40c of the disk type and a shiftable clutch member 40d splined to the shaft 40 to rotate therewith and move endwise thereon and engageable with either of the clutch members 40b and 40c so as to impart forward and reverse movements to the work spindle through gearing to be explained.

The clutch member 40c is provided with a gear 40f which constantly meshes with a gear 41b fixed to the shaft 41, so as to impart forward movement to the work spindle. The clutch member 40b is provided with a gear 40e which constantly meshes with an idler gear 40g which, in turn, constantly meshes with a gear 41a fixed to the shaft 41 to impart reverse movement to the work spindle.

It will be seen that the shiftable clutch member 40d can be engaged with either of the clutch members 40c or 40b to drive the shaft 41 in forward or reverse directions, or the clutch member 40d may be disconnected from both clutch members 40b and 40c to disconnect the drive to the shaft 41.

A three-step gear cone composed of gears 41c, 41d, and 41e is splined to the shaft 41 to rotate therewith and slide thereon, said gear cone being arranged intermediate the gears 41a and 41b. The gears 41c, 41d and 41e may be brought into mesh, respectively, with gears 42a, 42b and 42c, fixed to a rotatable shaft 42. It will be seen that the shaft 41, through the three-step gear cone on the shaft 41, may be driven at three different speeds in the forward and reverse directions.

The gear 42c constantly meshes with a gear 43a integral with a sleeve 43, which is freely rotatable on the spindle 36 but which is held against endwise movement thereon as is well understood in the art. The sleeve 43 is also provided with a gear 43b, the gears 43a and 43b being adapted to mesh, respectively, with gears 44a and 44b forming a rear two-step gear cone splined to a shaft 44 to rotate therewith and move endwise thereof. It will be seen that the shaft 44 can be operated at any of six different speeds in forward or reverse directions through the three and two-step gear cones already described.

The shaft 44 is provided with a second or front two-step gear cone having gears 44c and 44d thereon, this latter two-step gear cone likewise being splined to the shaft to slide thereon and rotate therewith. The gears 44ᶜ and 44ᵈ may be meshed, respectively, with gears 36ᵃ and 36ᵇ fixed to the work spindle 36, wherefore the spindle 36 may be driven at any one of twelve speeds in the forward and reverse directions through the three-step gear cone and the two two-step gear cones, and since the motor which drives the pulley 40 may be operated at high or low speeds the spindle 36 therefor will have two series of operating speeds of twelve speeds each in both the forward and reverse directions.

Referring to Fig. 4, it will be seen that the shiftable clutch member 40ᵈ is shifted by means of a yoke 45 carried by a sleeve 45ᵃ (see Fig. 6) that is slidably mounted on a rod 45ᵇ supported in brackets carried by the cover 35ᵃ of the head. The sleeve 45ᵃ is provided with a pair of spaced lugs between which extends the end of a lever 46 which is fixed to the lower end of a vertically extending shaft 47 rockably supported in the cover 35ᵃ of the head and having a lever 47ᵃ secured thereto above the cover.

The three-step gear cone on the shaft 41 is shifted to any one of its three operative positions by means of a shoe straddling the middle gear 41ᵈ of the cone and formed integral with a sleeve 48 which is endwise shiftable on a rod 49 which forms the support for the idler gear 40ᵍ. The sleeve 48 is provided with a lateral extension which, in turn, is operatively connected to a lever 50 that is fixed to the lower end of a vertically extending rockable shaft 51 carried by the cover 35ᵃ of the head.

The rear two-step gear cone on the shaft 44 is shifted by means of a shoe straddling the large gear 44ᵇ thereof and carried by a lever arm 52 freely rockable on the shaft 51 and arranged above the lever 50.

The front two-step gear cone on the shaft 44 is shifted to either of its two operative positions or to an inoperative position by means of a shoe straddling the gear 44ᶜ and carried by a lever arm 53 fixed to the lower end of a rockable vertically extending shaft 54 carried by the cover 35ᵃ of the head (see Fig. 5). The machine as thus far described embodies substantially conventional structure which per se forms no part of the present invention.

As previously stated the present invention relates to means for preselecting and changing the speeds of operation of a movable part of a machine tool together with means for controlling the preselection and speed changing and which is located at a point remote from the movable part referred to.

Reference will now be made to the means for preselecting and changing the speed of operation of the movable part of the machine tool, in this instance the spindle in the head thereof, but inasmuch as said preselecting and said speed changing means now to be referred to is substantially the same as that shown in the copending application of Max E. Lange, filed February 26, 1935, Serial No. 8,319, now Patent No. 2,068,552, issued January 19, 1937, it is not believed necessary to describe such means in great detail.

A shaft 55 is rotatably mounted in the cover 35ᵃ of the head and has arranged thereon a pair of spools 56 and 56ᵃ, which spools rotate with the shaft 55 but are slidable endwise thereon. The spools 56 and 56ᵃ are similar to the spools disclosed in the above mentioned copending Lange application Serial No. 8,319, and are provided on their adjacent sides with series of long and short projections and projections of equal length which cooperate when the spools are moved endwise equal distances toward each other to shift the levers 50, 52 and 53, which, in turn, shift the gear cones as previously described. Arranged on opposite sides of the shaft 55 and spaced equally therefrom are parallel rods 57 upon which slide sleeves 58 and 58ᵃ. The sleeve 58 carries a yoke which engages in a groove in the spool 56, while the sleeve 58ᵃ carries a yoke engaging in a groove in the spool 56ᵃ, wherefore it will be seen that when said sleeves are moved in opposite directions upon the rods 57, the spools 56 and 56ᵃ will be moved endwise away from each other, while when said sleeves are moved in the opposite direction the spools will be moved endwise toward each other. When the spools 56 and 56ᵃ are moved endwise toward each other the cooperating projections carried on the adjacent sides of the spools engage the pins 51ᵃ, 51ᵇ and 52ᵃ.

The sleeves 58 and 58ᵃ are simultaneously moved in opposite directions an equal distance to move the spools 56 and 56ᵃ equal distances toward and from each other by means of an equalizer bar 58ᵇ integral with a vertical shaft 58ᶜ rockably supported in a boss formed on the upper side of the head cover 35ᵃ (see Fig. 4). The bar 58ᵇ is provided at its opposite ends with shoes 58ᵈ which are located in slots extending transversely of upwardly extending portions of the sleeves 58 and 58ᵃ, (see Fig. 6). The upper end of the shaft 58ᶜ has secured thereto a lever 58ᵉ, wherefore, when said lever is rocked the bar 58ᵇ will be rocked and the sleeves 58 and 58ᵃ and the spools 56 and 56ᵃ will be moved in opposite directions equal distances.

The pin 51ᵃ is carried by a lever 51ᶜ which is loosely mounted on the shaft 51 and has pivoted to its outer end a link 51ᵈ in turn pivotally connected to a lever 54ᵃ which is fixed to the shaft 54 (see Figs. 4, 5 and 7). It will be seen that when the pin 51ᵃ is moved by the projections on the spools 56 and 56ᵃ that the shaft 54 and the lever 53 connected thereto and having a shoe straddling the front two-step gear cone will be shifted to move said cone to either one of its two operative positions or to a neutral inactive position, wherein the work spindle is disconnected from its drive train. The pin 51ᵇ is carried by a lever 51ᵉ which is fixed to the shaft 51, wherefore when the projections on the spools engage the pin 51ᵇ and move the latter the lever 50, fixed to the lower end of the shaft 51, will be moved to cause a shifting of the three-step gear cone to either one of its three operative positions. When the projections on the spools engage the pin 52ᵃ, the lever 52, loosely mounted on the shaft 51, is directly moved, wherefore the rear two-step gear cone is shifted to either one of its two operative positions. The usual spring points are provided, as shown in Figs. 4 and 5, to retain the levers 50, 52 and 53 in the different positions to which they are shifted.

The spools 56, 56ᵃ may be moved endwise away from each other sufficiently far to clear the pins 51ᵃ, 51ᵇ and 52ᵃ, after which the spools can be indexed to bring different sets of projections into position to act upon the pins, but preferably the spools are given a slight additional movement endwise after clearing the pins and before the indexing of the spools for a reason later to be explained.

Inasmuch as the work spindle 36 in the present illustration has twelve different speeds in both forward and reverse directions, in addition to a neutral position, in which the front two-step gear cone is disconnected from the spindle for the purposes of loading and unloading, the spools 56 and 56ª are provided with three series of 13 projections each or with a total number of thirty-nine projections, which cooperate with the pins 51ª, 51ᵇ and 52ª to effect movement thereof to shift the gear cones to obtain the various speeds and the neutral position as fully explained in Lange application, Serial No. 8319, now Patent No. 2,068,552, issued January 19, 1937.

The indexing of the spools is accomplished by giving rotative movement to the shaft 55 in a manner later to be explained, it being noted, however, that the shaft 55 at one of its ends is provided with a spiral gear 55ª which meshes with a similar spiral gear 59ª fixed on a shaft 59 rotatably mounted in the cover and extending beyond the front side thereof and having fixed to its extended end a dial 60, (see Figs. 7 and 11).

The periphery of the dial 60 is provided with four series of circumferentially spaced openings 60ª, it being assumed for purposes of illustration, that there are four operative steps required upon the work piece, thus requiring four different spindle speeds in each operative cycle. Each series of openings 60ª contains twelve circumferentially spaced openings corresponding to the twelve spindle speeds.

Since the shaft 59 is connected to the shaft 55 with a one to one ratio, it will be understood that one complete rotation of the dial 60 takes place for a complete rotation of the spools 56 and 56ª. It will be understood also that each of the twelve openings in the four series of openings in the dial represents a different spindle speed and the openings correspond to the cooperating projections on the spools 56 and 56ª. Each series of openings 60ª is provided with a pin 60ᵇ which may be arranged in any one of the openings in the series and held therein by a locking pin 60ᶜ, as clearly shown in Fig. 11. A face plate 60ᵈ is held on the front of the dial by a knob 60ᵉ and covers the heads of the locking pins 60ᶜ, said plate being provided with indicia in line with the openings 60ª and corresponding to the different spindle speeds and neutral position (see Fig. 1a). It will be understood that the pins 60ᵇ are positioned in the various openings 60ª, which correspond to the required speeds of operation for the spindle for each step during the operative cycle.

The pins 60ᵇ are adapted to successively contact with a stop pin 61 as the dial rotates, which stop pin is moved step by step from an inactive position, as shown in dotted lines at the left side of Fig. 14, to five active positions, A, B, C, D, E, in the first four of which, namely, positions A, B, C and D it is engaged by the removable pins 60ᵇ for the four different speeds of operation of the spindle in the operative cycle, and in the fifth position, namely, position E, it is engaged by a fixed pin 60ᶠ carried by the dial for the neutral position of the work spindle when the front two-step gear cone is disconnected therefrom. It will be understood that when the pins 60ᵇ and 60ᶠ engage the stop pin 61 that the rotation of the dial 60 and the spools 56 and 56ª is stopped and the spools are thus indexed and held in such positions that when the spools are moved inwardly the pins 51ª, 51ᵇ and 52ª will be moved by the projections on the spools to shift the different gear cones to obtain the desired speeds of operation of the work spindle. The dial and spools may be held in the different positions by suitable detent means, such as the star wheel and roller arrangement shown in said Lange application, Serial Number 8319, and hence not illustrated herein.

The stop pin 61 is moved from its inactive position to its five active positions by mechanism now to be described. The pin 61 is carried by a slide 62 mounted in a bracket 62ª secured to the front side of the cover 35ª of the head, said bracket having a recess housing the slide 62, which recess is provided with a slot through which the pin 61 projects, whereby a rigid support is provided for the slide so that the slide will be capable of taking the slight blows imparted to it when the pin 61 is contacted by the pins 60ᵇ and 60ᶠ. The slide 62 is moved inwardly and outwardly in the recess in the bracket 62ª to bring the pin 61 into registration with the various pins 60ᵇ and 60ᶠ by means of a bell crank lever 63 pivoted in the bracket and operatively connected to the slide by a pin and slot connection as shown in Fig. 14. The bell crank lever 63 is also operatively connected by a pin and slot connection to a notch bar 64, said bar 64 being located at right angles to the slide 62 and extending parallel to the rods 57 and adjacent to the left hand rod 57, as viewed in Figs. 4 and 12.

The bar 64 is provided at each end with reduced portions 64ª and 64ᵇ, the portion 64ª being in the form of a sleeve extending into a tubular bushing 65 carried by the cover 35ª, which bushing and the portion 64ª house a spring 65ª which at all times tends to move the notch bar 64 toward the right as viewed in Figs. 9 and 10. The notch bar 64ª is held against turning movement by means of a pin carried by the bushing 65 and engaging in a longitudinal slot in the sleeve portion 64ª, see Figs. 6, 9 and 10. The portion 64ᵇ of the notch bar 64 extends into a two-part sleeve 66 which is movably mounted in a bore in the cover 35ª so as to be capable of sliding endwise therein.

The outer part of the two-part sleeve 66 is provided with a head 66ª adapted to abut the outer side of a bracket 67 secured to the cover 35ª to limit the movement of the two-part sleeve in an inward direction with respect to the cover. A spring 66ᵇ surrounds the outer part of the two-part sleeve 66 and abuts at one end the end of the inner part of said sleeve and at its opposite end the inner shoulder of the bracket 67, said spring acting to normally hold the two-part sleeve inwardly of the cover with the head 66ª in abutting engagement with the bracket 67 as viewed in Fig. 9.

A stop rod 68 is mounted in the two-part sleeve 66 and can be adjusted to and held in various positions therein by means of a locating pin 68ª which extends through an opening in the head 66ª and through any one of a plurality of openings 68ᵇ in the stop rod 68, (see Figs. 6 and 10).

It will be noted by reference to Fig. 10 that when the notch bar 64 is free to be moved by the spring 65ª to its extreme right hand position, that the portion 64ᵇ of the bar will engage the inner end of the stop rod 68, at which time, if the innermost hole 68ᵇ in the stop rod 68 is engaged by the positioning pin 68ª, the slide 62 will be in its outermost location with the pin 61 in its inactive position.

In cases where only three operative speeds in a working cycle need be given to the spindle the locating pin 68ª would be positioned in the next or second opening 68ᵇ in the stop rod 68, wherefore the slide 62 when the notch bar 64 is in the position shown in Fig. 10 would move to a position where the stop pin 61 is in position A shown in Fig. 14 and will be in alignment with the first row of openings 60ᵃ in the dial 60, it being understood that the first row of openings will not have a pin positioned therein in this instance because only three spindle speeds will be required, and, therefore, position A of the stop pin 61 is now an inactive position, while positions B, C, D and E are active positions since the stop pin 61 in such positions is engaged by pins 60ᵇ in the three inner series of openings 60ᵃ of the dial and by the fixed pin 60ᶠ.

The sleeve 58 on the rod 57 is provided with an extension 58ᶠ upon which is slidably supported a pawl carrying member 69 provided with a pivoted pawl 69ᵃ normally urged in a downward direction, as viewed in Fig. 8, by a spring 69ᵇ. The member or slide 69 is provided with a two-part bore, in the larger portion of which a coil spring 69ᶜ is housed, which spring abuts at one end a collar 58ᵍ screwed to the threaded end of the extension 58ᶠ. The spring 69ᶜ acts to normally urge the member 69 toward the left, as viewed in Fig. 8, or into a position wherein the member 69 will abut the right hand side of the sleeve 58 and the upstanding portion thereof which receives the shoe carried by the equalizer bar 58ᵇ, see Figs. 8 and 10. The said upstanding portion of the slide 58 is provided with a pin 58ʰ, which engages in the smaller portion of the bore in the member 69 and holds the member against turning movement on the extended portion 58ᶠ of the sleeve.

Assuming that the sleeve 58 is in the position shown in Figs. 8 and 9, it will be noted that the bearing pin of the pawl 69ᵃ has engaged with a stationary abutting pin 70 carried by the cover 35ᵃ. It will be understood that as the sleeve 58 and the member 69 were moving to positions shown in Figs. 8 and 9, the bearing pin of the pawl 69ᵃ engaged the pin 70, wherefore the member 69 was held against further movement to the left, as viewed in the drawings, while the sleeve 58 continued such movement until it abutted the cover 35ᵃ. The additional movement toward the left of the sleeve 58 while the member 69 was held stationary by the pin 70 acted to compress the spring 69ᶜ and to separate the member 69 from the sleeve 58 a distance, as indicated in Fig. 8, for a purpose later to be described.

Now assuming that the sleeve 58 is moved from the position shown in Fig. 8 toward the right, as viewed in the drawings, it will be seen that during the first part of this movement the spring 69ᶜ, which has been compressed, holds the bearing pin of the pawl 69ᵃ in engagement with the fixed pin 70 and holds the member 69 stationary until the spring has expanded and the sleeve 58 comes into abutting relationship with the left hand side of the member 69, after which the continued movement of the sleeve 58 to the right moves the member 69 in unison therewith and carries the bearing pin of the pawl 69ᵃ away from the stationary pin 70, until the collar 58ᵍ abuts with the boss on the inside of the cover 35ᵃ, at which time the parts are in the position shown in Fig. 10. During the time that the member 69 is moving in unison with the sleeve 58 toward the right, the pawl 69ᵃ rides up upon a wedge bar 71 which overlies the notch bar 64 and has its right hand portion adjustably housed in the cover 35ᵃ, it being noted by reference to Fig. 9 that the right hand portion of the wedge bar 71 is provided with an upwardly extending end straddling a groove formed in an adjustable two position screw 71ᵃ carried by the bracket 67. It will be noted that in Fig. 10 the notch bar 64 is shown in its extreme right hand position and that the left hand notch of the six notches 64ᶜ formed on the upper side of the notch bar is located beyond the end of the wedge bar 71 and the wedge bar is in its most right hand position with its upwardly extending end abutting the inner side of the bracket 67, (see Fig. 9).

In those instances where it is desired to actuate the dial 60 manually the adjusting screw 71ᵃ is turned until the shoulder carried by its head abuts the outside of the bracket 67, at which time the wedge bar 71 has been moved inwardly to a position where it will cover all of the notches 64ᶜ on the upper side of the notch bar 64 when the latter is in its most right hand position as shown in Fig. 10, and hence the pawl 69ᵃ will be rendered inactive and will not engage in any of the notches to produce movement of the notch bar.

The notch bar 64 being in its most right hand position, as shown in Fig. 10, and the sleeve 58 being moved to the left or to spool opening position, it will be seen that the member 69 and sleeve 58 will move in unison during the first portion of the movement of the sleeve and that the pawl 69ᵃ carried by the member will ride along the top of the wedge bar 71 until it reaches the end thereof, whereupon it will be urged by its spring into the left hand notch 64ᶜ of the notch bar, after which the notch bar 64 will be moved by the pawl and member toward the left, it being understood that the spring 69ᶜ is stronger than the spring 65ᵃ, until the stationary pin 70 engages the bearing pin of the pawl 69ᵃ and stops the movement of the member 69 and notch bar 64, it being remembered that the sleeve 58 continues a short distance to move the spools to their most outward position, and until it abuts the boss on the inside of the cover 35ᵃ, the spring 69ᶜ being compressed during this movement by the collar 58ᵍ. The movement of the notch bar 64 occasioned by the engagement of the pawl 69ᵃ acts through the bell crank 63 to shift the slide 62 to move the stop pin 61 from its left hand inactive dotted line position in Fig. 14 to its first active position A. As the notch bar 64 is moved by the pawl 69ᵃ the end of a pivoted pawl 72 arranged below the notch bar comes into registry with the first notch of a series of notches 64ᵈ on the underside of the bar and said pawl 72 is urged into engagement with the said notch by its spring to hold the notch bar in its advanced position and against its tendency to move to the right because of the spring 65ᵃ which has been compressed by the movement of the notch bar toward the left. The spools 56 and 56ᵃ are now in their most outward position and the stop pin 61, as previously stated, is in position A. The spools are now indexed to preselect the desired speed, and during the indexing of the spools the dial 60 turns until the pin 60ᵇ, carried by the first series of openings in the dial, abuts the stop pin 61 in position A and thus locates the spools and dial in their properly indexed position. The mechanism for indexing the spools and dial will later be explained.

After the spools have been indexed they are brought inwardly to shift the gear cones and obtain the preselected speed. During this inward movement of the spools the sleeve 58 first moves independently, as has been previously explained, while the member 69 remains stationary. As soon as the sleeve 58 abuts the member 69 the latter moves in unison with the sleeve toward the left until the collar 58ᵍ abuts the boss within the cover 35ᵃ, during which time the pawl 69ᵃ will have ridden upwardly upon the wedge bar 71.

Inasmuch as the notch bar 64 has been moved one notch to the left, it will be understood that the second notch from the left hand end of the series of notches 64ᶜ is now located beyond the beveled end of the wedge bar 71.

When the next speed is to be preselected and the spools are moved to their most outward position, the member 69 with its pawl 69ᵃ again moves with the sleeve 58 until the bearing pin of the pawl engages the stationary pin 70, but just prior to this time the pawl 69ᵃ has ridden off of the wedge bar 71 and has engaged in the second notch 64ᶜ of the notch bar 64 and caused a movement of the latter one notch to the left. As the notch bar 64 moves one notch to the left the pawl 72 rides out of the left hand notch 64ᶜ and snaps into the second notch 64ᵈ. The movement of the notch bar 64 one notch to the left again causes a movement of the slide 62 to shift the stop pin 61 from active position A to active position B. Now when the spools are indexed to preselect the second spindle speed the dial rotates and the pin 60ᵇ carried by the second series of circumferentially spaced openings in the dial will engage the stop pin 61 in active position B and position the spools and dial in the desired way for obtaining said second speed.

This operation is continued until the last speed in the operative cycle has been preselected and the stop pin 61 which is now in position D has been engaged by the pin 60ᵇ carried by the dial in the most inward series of openings. At this time when the spools are again moved to their most outward position to preselect the neutral position of the work spindle, the pawl 69ᵃ will engage in the last or right hand notch 64ᶜ to move the notch bar 64 one notch to the left and to shift the stop pin 61 from position D to position E. At this time the parts are in the positions shown in Fig. 9, and it will be noted that the pawl 72 is rendered inactive. The step by step movements which have been imparted to the notch bar 64 to shift the pin 61 to positions A, B, C, D and E have compressed the spring 65ᵃ, and when the pin 61 has been shifted to neutral position or position E, a heel 64ᵉ, carried on the underside of the right hand end of the bar 64, has come into engagement with a pawl 73 and swung the same from the position shown in Fig. 10 to that shown in Fig. 9, wherein a locking tongue 73ᵃ, carried by the pawl 73, engages with a notch in the end of the pawl 72 to render it inactive. After the spools and dial have rotated until the fixed pin 60ᶠ comes into engagement with the stop pin 61 in position E and the spools are moved inwardly to shift the gear cones to disengage the front two-step gear cone from the spindle, the pawl 69ᵃ moves to the right as previously explained, and since the notch bar 64 is not restrained by the pawl 72, it will move with the pawl 69ᵃ until the latter rides upon the wedge bar 71, at which time the notch bar 64 is freed and the spring 65ᵃ will shift the latter to its most right hand position, or until the end of the portion 64ᵇ abuts the stop rod 68 as shown in Fig. 10. During the movement of the notch bar 64 to its most right hand position the slide 62 has been moved outwardly by the bell crank 63 and the stop pin 61 has been shifted from position E to its left hand inactive dotted line position, as viewed in Fig. 14, thus restoring the parts to their position at the commencement of the cycle. Also, during the movement of the notch bar 64 to its most right hand position, the heel 64ᵉ moves out of engagement with the pawl 73 and the latter is moved to disengage the tongue 73ᵃ from the notch in the pawl 72 to render the same active. The movement of the pawl 73 is occasioned by the engagement of the extension 64ᵇ with the stop rod 68 under the action of the spring 65ᵃ which moves the two-part sleeve 66ᵃ in a direction to compress the spring 66ᵇ, wherefore a downwardly extending arm on the two-part sleeve exerts a pull upon a link 73ᵇ connected to the pawl 73, said link having a head lying on the right hand side of the downwardly extending arm of the two-part sleeve, as clearly shown in Figs. 9 and 10.

As has been previously stated, after the spools have been moved to their most outward position, they are indexed to preselect the next speed of operation or the neutral position of the work spindle. The means for causing the indexing of the spools will now be described.

The sleeve 58ᵃ is provided with a downwardly extending portion 58ⁱ having at its lower end a fork which straddles a rod 74, provided at its end with a shoulder 74ᵃ (see Figs. 6 and 12). The rod 74 extends through the wall of the cover of the head into a clutch housing 75 on the end of the machine and carries at its end within the housing 75 a forked portion straddling a lever arm 76ᵃ, formed integral with a sleeve 76 that is rockably supported upon a rod 77 carried by the housing 75 (see Fig. 6ᵃ). A spring 74ᵇ is arranged on the rod 74 between the cover 35ᵃ and the forked portion at the end of the rod and acts to urge the rod 74 outwardly with respect to the housing 75. The sleeve 76 is provided with two integrally spaced lever arms 76ᵇ and 76ᶜ, which carry at their ends shoes engaging in a circular groove formed in a shiftable clutch member 78 that is splined to a sleeve extension formed on a worm wheel 79, which worm wheel 79 and its extended sleeve are freely rotatable on an extension of the indexing shaft 55 which carries the spools 56 and 56ᵃ. A disk 80 is pinned to the extension of the shaft 55 within the housing 75 and has on its outer face an annular recess carrying a friction ring 80ᵃ, which has a pin connection with the disk 80 so as to rotate therewith and have movement endwise thereof. The disk 80 and ring 80ᵃ are housed within a clutch member 81, having on its face clutch teeth adapted to engage clutch teeth on the face of the clutch member 78 on the sleeve extension of the worm gear 79. The clutch member 81 is freely rotatable on the disk 80, but is held against endwise movement with respect thereto by a shoulder plate 81ᵃ. The friction ring 80ᵃ is urged into frictional engagement with the wall of the clutch member 81 by means of a plurality of springs 80ᵇ, wherefore said clutch member 81, friction ring 80ᵃ and disk 80 rotate in unison.

The worm wheel 79 is driven from a worm shaft 82 having a worm 82ᵇ meshing with the worm wheel and carrying a bevel pinion 82ᵃ which meshes with a bevel pinion 83ᵃ fixed on the inner end of a stub shaft 83 rotatably mounted in the housing 75, said shaft 83 having on its outer end a pulley 83ᵇ which receives a belt that extends around a pulley 40ʰ on the pulley shaft 40. Inasmuch as the pulley shaft 40 is driven at a constant speed it will be seen that the worm wheel 79 and its sleeve extension and the clutch member 78 splined thereto are also driven at a constant speed.

When the machine is operating and the spools 56, 56ᵃ are being moved toward their most outward position, the rod 74 will slide freely through the downwardly extending portion 58ⁱ of the sleeve 58ᵃ until said portion engages the shoulder 74ᵃ on the rod, whereupon the further movement of the sleeve 58ᵃ will cause the rod to be drawn into the cover of the head against the tension of the spring 74ᵇ, with the result that the lever arm 76ᵃ and the sleeve 76 are rocked in a direction such that the lever arms 76ᵇ and 76ᶜ shift the clutch member 78 to bring the clutch teeth thereof into mesh with the clutch teeth on the clutch member 81, at which time the shaft 55 will be rotated through the clutch member 81 and disk 80 to cause a rotation of the spools and of the dial 60. The rotation continues until one of the pins 60ᵇ or the fixed pin 60ᶠ comes into engagement with the stop pin 61, whereupon the movement of the dial and shaft 55 with the spools thereon is arrested, a slippage between the friction ring 80ᵃ and the clutch member 81 taking place at this time and until the spools 56, 56ᵃ are brought slightly inwardly to disengage the downward extension 58ⁱ from the shoulder 74ᵃ of the rod 74 to allow the spring 74ᵇ to move the rod to cause a movement of the clutch member 78 to disengaged position.

It will be seen from the description of the clutch disclosed in Figs. 6 and 6ᵃ that the clutch members 81 and 78 remain engaged until the spools and dial have been turned and stopped and the spools moved inwardly a short distance toward their gear shifting position to free the downward extension 58ⁱ on the sleeve 58ᵃ from the shoulder 74ᵃ of the rod 74.

In Figs. 6ᵇ, 6ᶜ and 6ᵈ a different form of clutch is illustrated from that just described, and this modified form of clutch is such that the clutch members are engaged when the spools are moved to their most outward position, as in the clutch just above described, and remain engaged for one complete revolution, even though the spools are immediately moved toward their inward position the slight distance formerly employed to disengage the clutch member 78. The modified clutch now to be described has the advantage that the attention of the operator is not required to disengage the clutch after it has once been engaged, since, as stated, the clutch members are automatically disengaged after one complete revolution by mechanism now to be described.

The modified form of clutch is housed in a clutch housing 75ᵃ and is driven from the pulley 83ᵇ by the stub shaft 83 carrying at its inner end a bevel gear 83ᵃ which meshes with a bevel gear 82ᵃ on a worm shaft 82 having a worm 82ᵇ fixed thereto and meshing with a worm wheel 84 which, in this instance, freely rotates on the shaft 55 and has on its inner face clutch teeth 84ᵃ, the worm wheel 84 being driven at a constant speed, as was the worm wheel 79 in the previously described form of clutch. A disk 85 is splined on the shaft 55 to rotate therewith and slide axially thereon, which disk carries a friction ring 86 pinned to the disk 85 to rotate therewith but move endwise relative thereto, said friction disk 86 being moved under spring pressure into frictional engagement with a clutch member 87 which houses, by means of a shoulder plate 87ᶜ, the disk 85 and ring 86, and has on its outer face clutch teeth 87ᵃ adapted to intermesh with the clutch teeth 84ᵃ on the worm wheel 84.

A shouldered bushing 88 serving as a stop is arranged on the shaft 55 between the outer side of the cover and the disk member 85 and is surrounded by a spring 88ᵃ which acts to urge the disk member 85 and the clutch member 87 in a clutch engaging direction; it being noted that the bushing 88 limits the movement of the disk 85 and clutch member 87 in the opposite direction.

The clutch member 87 is provided on its periphery with a cam block 87ᵇ, which cooperates with a roller 89ᵃ carried by the upper end of a bell crank lever 89 (see Fig. 6ᵈ). The lever 89 is normally urged by a spring 89ᵇ inwardly toward the clutch member 87, so that the roller 89ᵃ ordinarily lies in the path of the cam block 87ᵇ as the clutch rotates. The roller 89ᵃ is carried by one arm of the lever 89, while the other arm thereof, indicated at 89ᶜ, extends upwardly and outwardly at an angle from the pivot point of the lever and cooperates with a conical shoulder 90ᵃ formed on a rod 90 which, in function, is similar to the rod 74 previously referred to. The rod 90 at its end which is within the cover of the head is provided with a shoulder 90ᵇ, while within the clutch housing 75ᵃ a spring 90ᶜ arranged on the rod and engaging an abutment collar thereon acts to normally urge the rod outwardly into the clutch housing.

The downward extension 58ⁱ of the sleeve 58ᵃ straddles the rod 90 and when the sleeves 58, 58ᵃ are moved in a direction to open the spools 56, 56ᵃ, the extension 58ⁱ moves to the left, as viewed in Fig. 6ᶜ, and engages with the shoulder 90ᵇ to move the rod 90 against the action of the spring 90ᶜ, which movement by means of the conical shoulder 90ᵃ rocks the lever 89 in a clockwise direction to retract the roller 89ᵃ from engaging position with respect to the cam block 87ᵇ. As soon as the roller 89ᵃ has been withdrawn from the cam block 87ᵇ, the spring 88ᵃ moves the clutch member 87 and disk 85 toward the right, as viewed in Fig. 6ᶜ, and brings the clutch teeth 87ᵃ into intermeshing relationship with the clutch teeth 84ᵃ on the constantly rotating worm wheel 84, whereupon, through the friction ring 86, the disk 85 and shaft 55 are driven from the worm wheel.

As soon as the clutch members have been engaged the spools may be moved a slight distance inwardly, whereupon the shoulder 90ᵇ is disengaged from the downward extension 58ⁱ on the sleeve 58ᵃ and the rod 90 is moved by the spring 90ᶜ in a direction to release the conical shoulder 90ᵃ from the lever 89 and allow the spring 89ᵇ to swing the lever to a position where the roller 89ᵃ lies in the path of the cam block 87ᵇ on the rotating clutch member 87 (see Fig. 6ᵈ). It will be seen that when the clutch member 87 has made a complete revolution the cam block 87ᵇ again contacts the roller 89ᵇ and the clutch member 87 being in rotation will be cammed toward the left, as viewed in Fig. 6ᶜ, to disengage the clutch teeth 87ᵃ from the clutch teeth 84ᵃ and arrest further rotation of the clutch member 87, disk 85 and shaft 55. The roller 89ᵇ now acts in conjunction with a pawl 91, now to be referred to, to restrain the clutch member 87 against movement by the spring 88ᵃ until it has again been withdrawn from the cam block by a movement of the spools to their most outward position. After the clutch member 87 has made a complete revolution and the cam block 87ᵇ has come into contact with the roller 89ᵃ, the bell crank pawl 91 snaps into engagement with the underside of the cam block 87ᵇ under the action of a spring 91ᵃ, while the clutch teeth 84ᵃ and 87ᵃ are substantially separated, and together with the roller 89ᵃ holds the clutch member 87 in such position as shown in Fig. 6ᶜ. The cam block 87ᵇ now acts as a wedge between roller 89ᵃ and pawl 91, wherefore clutch member 87 is effectively held against rotation and endwise movement.

It will be understood that when the roller 89ª is withdrawn from the cam block 87ᵇ and the clutch member 87 rotates, that as the cam block 87ᵇ comes into engagement with the pawl 91 the latter will be rocked outwardly and will slide over the cam block 87ᵇ until it is free to snap in beneath the under edge thereof, when the cam block 87ᵇ has reached a position relative to the roller 89ª as shown in Fig. 6ᶜ.

It will be noted that although the clutch is engaged by the operator by mechanism later to be described, it is automatically disengaged without the attention of the operator, after making a complete revolution. It will be further understood that as the clutch member rotates through a complete revolution the shaft 55, spools 56, 56ª and the dial 60 are moved until the pins 60ᵇ or 60ᶠ come into contact with the stop pin 61, whereupon the movement of the dial, shaft 55 and the spools thereon is arrested and a slippage between the friction ring 86 and the clutch member 87 takes place for the remainder of the revolution of the said clutch member. It will be noted that the clutch may be disengaged at the end of one complete revolution since the spools and dial need to be rotated at all times only a portion of a complete revolution. The mechanism for controlling the preselecting and speed changing devices and the starting, stopping and reversing of the operation of the spindle from a remote point will now be described.

Referring to Fig. 1, it will be seen that on the front side of the machine tool a pair of shafts 92 and 93 are provided adjacent the usual feed shaft 37ª, and that said shafts are supported by a bracket 94 which retains the same against endwise movement, and by the apron 38ª of the cross-slide and the apron 39ª of the turret slide. The aprons 38ª and 39ª support the shafts as has been stated, but may have movement relative thereto axially of the shafts, and it should be noted that the shafts are of such length that they will always be supported by the aprons even though the slides are in their most rearward positions.

The shafts 92 and 93 may be rocked individually by means of a lever 95 which is the control lever for preselecting and changing the spindle speeds and for controlling the starting, stopping and reversing of the spindle. It will be noted that the control lever 95 is located between the cross-slide apron and the turret slide apron, and is in a convenient position for the operator who, when the machine is operating, will stand adjacent to the cross-slide to observe the operation of the machine.

The lever 95 is pivotally connected between the arms of a substantially U-shaped member 96 (see Fig. 15) carried by a sleeve 96ª splined to the shaft 93 to rock therewith but to have movement endwise thereon, said sleeve being threaded on its outer side and extending into a threaded boss on the apron 38ª, the threaded connection between the sleeve and boss permitting the sleeve and the U-shaped member 96 to rock relative to the apron but to move endwise therewith and to rock the shaft 93. The control lever 95 extends through a slot 97ª formed in a bracket 97 which is secured to a pair of supporting pins 97ᵇ that extend into comparatively long bosses formed in the apron 38ª, wherefore it will be seen that said bracket 97 is in the form of a slide which can be moved in an axial direction with respect to the shafts 92 and 93 and relative to the apron 38ª.

When the control lever 95 is moved from the full line position in Figs. 16 and 17 to the dotted line position F, the bracket 97 is moved from the full line to the dotted line position, wherefore a link 98 which is pivotally connected to the bracket 97 and to an upwardly extending lever 99ª formed on the end of a sleeve 99, is brought from the full line position to the dotted line position, as shown in Fig. 17, in which latter position said link is arranged at right angles to the sleeve 99 and, therefore, causes a rocking movement to be imparted to said sleeve through the lever 99ª. The sleeve 99 is splined on the shaft 92 to rock therewith and to move endwise thereon, said sleeve being threaded and extending into a boss formed in the apron 38ª similar to the manner in which the sleeve 96ª extends into its supporting boss, with the boss for the sleeve 99 somewhat longer than the boss for the sleeve 96ª, as viewed in Fig. 17. As in the case of the sleeve 96ª, the threaded engagement between the sleeve 99 and its boss allows said sleeve and lever 99ª to rock relative to the apron and to move endwise therewith and to rock the shaft 92.

The rocking of the shaft 93 controls the clutch member 40ᵈ to engage the friction clutches 40ᵇ and 40ᶜ for starting, stopping and reversing the operation of the spindle 36, it being noted by reference to Fig. 15, that when the lever 95 is in the full line position the clutch 40ᶜ is engaged for forward operation of the spindle, while when it is in dotted line position N the operation of the spindle has been stopped and the clutch is disengaged, while in dotted line position R the clutch 40ᵇ is engaged for reverse operation of the work spindle.

The rocking of the shaft 92 controls the endwise movement and the indexing of the spools and dial and the shifting of the gear cones. In other words, the movement of the shaft 92 controls the preselecting and gear changing device.

Referring to Fig. 16 when the lever 95 is in its full line position the spools are in their most inward position after having shifted the gear cones, and when it is in dotted line position G the spools have been moved partly outwardly a distance sufficient to clear the gear shifting pins, but at this time the clutch for the indexing shaft 55 is not engaged. When the lever 95 is in dotted line position F, the spools are in their most outward position and the clutch for indexing the spools and dial has been engaged.

The shaft 92 adjacent the bracket 94 has connected thereto a lever 100, which has at its upper end a forked portion straddling one end of and pivotally connected to a rod 101, which extends through openings in the bed of the machine. The opposite end of the rod 101 projects outwardly of the bed and is pivoted between the forked portion of one arm of a bell crank lever 102 pivotally carried on a suitable bracket secured to the bed, the other arm of said bell crank lever being in the form of a fork with each portion of the fork pivotally connected to valve rods 103 and 104.

The shaft 93 on the side of the bracket 94 opposite to the side on which the lever 100 is mounted on the shaft 92 has secured thereto a lever 105 having a forked upper portion straddling and pivotally connected to one end of a rod 106 which extends through suitable openings in the bed and has its opposite end projecting outwardly of the rear side of the bed and pivotally connected to the forked portion at the upper end of one arm of a bell crank lever 107. The other arm of the bell crank lever 107 is in the form of a fork with each portion of the fork pivotally connected to the upper ends of valve rods 108 and 109.

As previously mentioned, both the shafts 92 and 93 are rocked to three different positions by movements of the control lever 95 in two different directions, and in order to hold the shafts in such positions suitable spring points, indicated at 110 in Figs. 18 and 20, are provided which engage in downward extensions in the bell cranks 102, 107.

The valve rods 103 and 104 are slidably supported in a valve housing 111 and carry at their inner ends valve bodies 112 and 113 which move in unison in separate valve chambers 114 and 115. The valve rods 108, 109 likewise are slidably supported in the same valve housing 111 and have at their inner ends valve bodies 116 and 117 which reciprocate in unison in separate valve chambers 118 and 119, as clearly shown in Fig. 19.

Valve bodies 112 and 113 are moved by the movement of the lever 95 in a plane parallel to the ways of the bed to rock the shaft 92, as already stated, and said bodies control the passage of fluid under pressure from a suitable source, not shown, to a fluid motor 120 arranged on the top of the cover of the head (see Fig. 2) and operatively connected to the lever 58e, which is secured to the vertical shaft 58c that actuates the equalizer bar 58b which, in turn, effects the inward and outward movements of the spools and controls the clutch for operating the shaft 55 and indexing the spools and dial.

The movements of the valve bodies 116, 117, occasioned by the movement of the control lever in a transverse direction to the bed and the rocking of the shaft 93, controls the passage of fluid under pressure from the source previously referred to, to a fluid motor 121, also located on the top of the cover of the head (see Fig. 2) and operatively connected to a lever 47a which is secured to the upper end of the vertical shaft 47 that actuates the shifting yoke 45 for the main clutches in the drive to the work spindle.

The valve housing 111 is illustrated as housing two independent sets of valves of two valves each, namely, the set including the valves having the valve bodies 112, 113 and the set including the valves having the valve bodies 116, 117. The housing 111 is provided with inlet passages 123 communicating with the valve chambers 114, 115 and 118, 119 midway between ends of said chambers. Similarly, the housing 111 is provided with exhaust passages 125 communicating with the upper and lower ends of the valve chambers in each set of valves, namely with valve chambers 114, 115 and 118, 119, respectively. The inlet passages are connected by suitable piping 126 to the source of supply of pressure fluid, while the outlet or exhaust passages are connected by suitable piping 127 to an exhaust (see Fig. 18).

Referring to the diagrammatic illustration of Fig. 21, it will be seen that the two sets of valves have been separated and are shown in section taken along the irregular line 21—21 of Fig. 20, while the fluid motors 120 and 121 are shown in section and connected by the conduits to the valves. The fluid motor 120 which effects the inward and outward movements of the spools and the engagement and disengagement of the clutch for the indexing drive for the spools is a two piston motor, as will now be explained.

The main or primary piston 128 is connected by a piston rod to the lever 58e and operates in a cylinder 129. The secondary piston 130 of the motor 120 is substantially larger in diameter than the primary piston 128 and operates in a cylinder 131 separate from the cylinder 129, said piston 130 having an abutting pin 132 which is slidably supported in an opening in the partition between the cylinders 129 and 131, and in certain positions of the piston 130 extends into the cylinder 129 to form an abutting stop for the primary piston 128. Ports connected with the opposite ends of the cylinder 129 are in communication with conduits 133 and 134, which communicate, respectively, with the valve chamber 115. The opposite ends of the cylinder 130 are in communication by means of suitable ports with conduits 135 and 136, which communicate, respectively, with the valve chamber 114.

When the lever 95 is in the full line position as shown in Fig. 16, the spools are in their most inward position and the valve bodies 112 and 113 are in the positions shown in Figs. 19 and 21. At this time the conduit 134 communicates with the space between the two flanges of the valve body 113, as does the inlet passage 123, and, therefore, pressure fluid is acting on the under side of the primary piston 128, as viewed in the drawings, to hold said piston in its uppermost position, it being noted that the conduit 133 which communicates with the cylinder 129 above the piston communicates with the valve chamber 115 below the valve body and with the exhaust outlet 125. The conduit 135 communicates with the space between the flanges of the valve body 112 and with the inlet passage 123, wherefore the pressure fluid is acting upon the under side of the secondary piston 130 to hold the latter in its uppermost position with the abutting pin 132 extending its maximum distance into the cylinder 129, while the conduit 136 which communicates with the cylinder 131 above the piston 130 is in communication with the valve chamber 114 below the valve body and with the exhaust outlet 125.

When the control lever 95 is moved to position G, as shown in Fig. 16, the valve bodies 112 and 113 are moved from the position shown in Fig. 21 to the position shown in Fig. 23. During this movement the upper flange on the valve body 113 passes to the opposite side of the conduit 134, which conduit is now in communication with the exhaust passage 125, while the lower flange on the valve body passes below the inlet for the conduit 133, wherefore said conduit is now in communication with the space between the flanges and with the inlet passage 123. In order to simplify the drawings the conduits have been illustrated in Figs. 22, 23, 24 and 25, but the port openings corresponding to the conduits have been given the same reference numbers. It will be seen that the fluid pressure is acting on the upper side of the primary piston 128 of the motor 120 to move said piston downwardly to cause movement of the spools toward their outer position, it being noted that the conduit 134 is now in communication with the exhaust side of the valve. It will be noted, however, that the movement of the valve body 112 in unison with the valve body 113 has not changed the relationship of the conduits 135 and 136 with respect to the inlet and exhaust passages of the valve, and that, therefore, the fluid pressure is still acting on the underside of the secondary piston 130 to hold the same in the position shown in Fig. 21 with its abutting pin 132 extended a maximum distance into the cylinder 129. The piston 128, therefore, will move downwardly in the cylinder 129 until it strikes the abutting pin 132, and since the secondary piston 130 is of greater diameter than the piston 128, the pressure acting on the piston 130 is sufficient to stop the further movement of the piston 128. The stoppage of the movement of the piston 128 by the abutting pin 132 takes place after the spools have moved part way to their outer position, but before the clutch controlling the drive of the shaft 55 and the indexing movement of the spools has become engaged.

The control lever 95 now being moved from dotted line position G to dotted line position F, the valve bodies 112 and 113 are moved from the position shown in Fig. 23 to the position shown in Fig. 22. At this time the movement of the valve body 112 has caused a variation in the relationship between the conduits 135, 136 with respect to the valve body, as shown in Fig. 23, from the relationship shown in Fig. 22, wherein the conduit 135 is connected to the exhaust side of the valve, while the conduit 136 is connected to the inlet side of the valve. It will now be found that the pressure fluid is acting through the conduit 136 upon the upper side of the secondary piston 130, while the lower end of the cylinder 131 is in communication through the conduit 135 with the exhaust, wherefore said piston 130 will move downwardly until it abuts the lower end of the cylinder and the abutting pin 132 will extend into the cylinder 129 a minimum distance and allow the piston 128 to move downwardly its maximum distance, inasmuch as the pressure fluid is still acting on the upper side of the piston 128. It will be noted that the relationship between the passages 133 and 134 and the valve body 113, as shown in Fig. 23, has not changed during the movement of said valve body to the position shown in Fig. 22. This further movement of the piston 128 imparts movement to the spools to bring the same to their most outward position and to engage the clutch which controls the drive to the shaft 55 for indexing the dial and spools. The engagement of the clutch continues until the spools and dial have been indexed and the pins 60b or 60f have engaged the stop pin 61, after which a slippage will take place in the clutch until the operator moves the control lever from position F to position G, which will restore the valve bodies 112, 113 from the position shown in Fig. 22 to the position shown in Fig. 23, wherefore the piston 130 will be moved to the position shown in Fig. 21, and due to the area differential between the primary and secondary pistons the former will be moved upwardly by the abutting pin 132 to shift the spools partially inwardly.

Of course when the one rotation clutch is employed to index the dial and spools the operator will move the control lever 95 from the full line position in Fig. 16 to the dotted line position F, and then immediately move said lever from position F to position G, it being understood that during the latter part of the movement of the lever from the full line position to position F that the roller 89a is withdrawn from the cam block 87b, thus allowing the clutch member 87 to move to clutch engaging position, while the movement of the lever from position F to position G restores the roller retracting mechanism to its inactive condition, with the result that after one revolution of the clutch member the roller again engages the cam block 87b and thus automatically disengages the clutch member 87.

When the lever 95 is moved from position G to the full line position, as shown in Fig. 16, the valve bodies 112, 113 move from the position shown in Fig. 23 to the position shown in Fig. 21, at which time the conduit 134 is connected with the inlet side of the valve so that the fluid pressure is then acting on the underside of the primary piston 128 and moves said piston to its uppermost position, the conduit 133 communicating with the cylinder above the piston and with the exhaust side of the valve. The movement of the valve body 112, however, does not change the relationship of the exhaust and inlet passages with respect to the secondary piston 130, and said piston is retained in the position shown in Fig. 21 by the fluid pressure acting on the underside thereof.

The movement of the piston 128 to its uppermost position from out of its abutting relation with the abutting pin 132 acts to move the spools 56, 56a to their most inward position to shift the pins 51a, 51b and 52a, which are operatively connected with the gear cones in the spindle drive.

It will be seen that when the lever 95 is moved from the full line position in Fig. 16 to position G that the spools are moved outwardly sufficiently far to clear the pins 51a, 51b and 52a, and that when the lever is moved from position G to position F the spools are moved to their most outward position and the clutch for the indexing drive is engaged and the spools and dial are indexed. It will further be seen that when the lever 95 is moved from position F to position G, assuming that the dial and spools have been located in their predetermined positions, the clutch is disengaged and the presetting has been completed, while movement of the lever from position G to the full line position after the completion of one operative step upon the work piece moves the spools inwardly to shift the gear cones to change the speed of operation of the spindle to the preselected speed for the next operative step.

The fluid motor 121 is similar to fluid motor 120 and has a primary piston 137 carried by a piston rod which is operatively connected with the lever 47a, for shifting the stop, start, and reverse clutches for the spindle drive, said piston operating in a cylinder 138. The motor 121 is provided with a secondary piston 139 of larger diameter than the primary piston and operating in a cylinder 140 which is operated from the cylinder 138, the secondary piston 139 having an abutting pin 141 which is somewhat longer than the abutting pin 132 previously referred to. The opposite ends of the cylinder 138 are connected by conduits 142 and 143 with the valve chamber 118, while the opposite ends of the cylinder 140 are connected by conduits 144 and 145 with the valve chamber 119.

When the lever 95 is in position N, as shown in Fig. 15, the main friction clutch is in neutral, and it will be noted that fluid pressure is acting on the underside of the piston 137 through the conduit 143 which communicates with the valve chamber 118 between the flanges of the valve body 116 and with the inlet passage 123, while the conduit 142 communicates with the valve chamber 118 and the exhaust passage 125, (see Fig. 21).

It will also be seen that fluid pressure is acting on the upper side of the secondary piston 139 through the conduit 144 which communicates with the valve chamber 119 between the flanges of the valve body 117 and with the inlet passage 123, the conduit 145 communicating with the cylinder 140 below the secondary piston 139 and being in communication with the valve chamber and with the exhaust passage 125. It will be understood that the primary piston 137 is now abutting the pin 141 and its upward movement has been stopped midway of the cylinder 138.

The operator when he moves the control lever 95 from position N in Fig. 15 to the full line position to rock the shaft 93 to obtain forward operation of the spindle, shifts the valve bodies 116 and 117 from the position shown in Fig. 21 to the position shown in Fig. 25. It will be noted that at this time the conduit 142 communicates with the inlet side of the valve, and hence the fluid pressure acts on the upper side of the piston 137 to move the latter downwardly, as viewed in Fig. 21, the lower side of the chamber 138 being connected with the exhaust side of the valve through the conduit 143. This movement of the control lever 95 from position N to full line position, as viewed in Fig. 15, does not change the relationship between the conduits 144 and 145 and the inlet and exhaust passages of the valve, and hence the secondary piston 139 remains in the position in which it is shown in Fig. 21.

The movement of the piston 137 downwardly, as viewed in the drawings, rocks the lever 47ª and causes the clutch member 40ᵈ to move into engagement with the clutch member 40ᶜ to give forward rotation to the work spindle. When the operator moves the control lever 95 from the full line position in Fig. 15 to position N or back to neutral position, the valve bodies 116 and 117 move from the position shown in Fig. 25 to the position shown in Fig. 21, at which time the piston 137 is moved upwardly by the pressure fluid acting on its underside until it engages the abutting pin 141 carried by the secondary piston 139, it being remembered that the secondary piston is of larger diameter than the primary piston and hence the movement of the primary piston 137 will be arrested by the pin 141.

The control lever 95 now being moved from position N to position R, as shown in Fig. 15, to reverse the operation of the work spindle, the valve bodies 116 and 117 move from the position shown in Fig. 21 to the position shown in Fig. 24. It will be noted that conduit 145 is now in communication with the inlet side of the valve, while conduit 144 is in communication with the exhaust side thereof, wherefore fluid pressure is applied to the underside of the secondary piston 139 and moves said piston upwardly until it abuts the motor housing at the end of the cylinder, the abutting pin 141 now extending into the cylinder 138 a minimum distance. The movement of the valve bodies 116 and 117 from the position shown in Fig. 21 to the position shown in Fig. 24 does not affect the relationship between the inlet and exhaust sides of the valves and the conduits 142 and 143, wherefore fluid pressure is still applied to the underside of the primary piston 137 and the latter, now that the abutting pin 141 is moving upwardly moves to its most upward position in the cylinder 138 and rocks the lever 47ª in a direction such that the clutch member 40ᵈ moves into clutching engagement with the clutch member 40ᵈ and hence through the idler gear 40ᵍ, the work spindle is driven in a reverse direction. When the clutch 40ᵈ is to be restored to neutral to stop the spindle drive, the lever 95 is moved from position R to position N, whereupon the valve bodies 116, 117 move from the position shown in Fig. 24 to the position shown in Fig. 21, while the primary piston 137 and secondary piston 139 move from the positions just described to the positions shown in Fig. 21, at which time the clutch member 40ᵈ is shifted to a position where it is disengaged from the clutch members 40ᵉ and 40ᶜ.

It will be noted that both fluid motors 120 and 121 include a primary piston and a secondary piston and that the pistons in each motor are controlled by individual sets of two valves each movable in unison, with the inlet and exhaust ports so arranged that the primary pistons of the motors are given two distinct and independent successive movements in each direction. The relationship of the inlet and exhaust ports with respect to the valve bodies is changed either at the beginning or at the conclusion of each movement of the valve bodies in unison, wherefore said valve bodies may have a substantial latitude of movement wherein their relationship, with respect to the exhaust and inlet passages, is not varied. In other words, the inlet and exhaust ports of the valves are so arranged that as the valve bodies move in unison the relationship between said ports and one of the valve bodies is changed at the beginning of the movement, while the relationship between said ports and the other of the valve bodies is not changed until the completion of said movement, that is to say, that after the relationship has been changed with respect to the first valve, the valve body thereof moves through the remainder of the movement without causing any change in the relationship, while the valve body of the second valve moves through the greater portion of the movement of the valve bodies without effecting any change in the relationship, inasmuch as such change takes place just prior to the completion of the movement of both bodies. This arrangement, it will be noted, holds good for the movement of the valve bodies in unison in both directions.

The successive and independent movements given to the primary pistons of the motors enable said pistons to rock the levers to which they are connected to any one of three different positions, wherefore the spools may be moved outwardly to a position where the projections thereon clear the pins 51ª, 51ᵇ and 52ª, while the indexing clutch remains disengaged, or the spools may be moved in the same direction to their most outward position to cause an engagement of the clutch and an indexing of the spools.

It is also possible to cause a movement of the spools inwardly sufficiently far to effect a disengagement of the indexing clutch, this being the time when preselecting of spindle speeds has been completed, and then the spools may be moved to their most inward position to effect a shifting of the gear cones to obtain a change to the preselected speed.

In the same way movement of the primary piston 137 in the motor 121 enables the clutch member 40ᵈ to be moved from neutral into engagement with the member 40ᶜ for forward operation of the spindle, from the last position back to neutral, and from neutral into clutching engagement with the clutch member 40ᵇ for reverse operation of the spindle, and then back to neutral.

As previously pointed out, it is advantageous to employ a remote control for the preselection and changing of spindle speeds and for the starting, stopping and reversing of the operation thereof in machine tools of the larger size, since it will enable the operator to remain in the position he must occupy in observing the operation of the machine and to control the operation thereof from that position. Inasmuch as the remote control is especially useful upon machine tools of the larger type, it will be evident that considerable force will be required to shift the larger type gear cones, and, therefore, it is preferable to operate the preselecting and speed changing means and the main control clutch by means of fluid pressure motors, that is, the control lever 95 may be shifted by the operator to obtain the preselecting and speed changing and the starting, stopping and reversing of the spindle with a minimum effort, due to the employment of independent power means for shifting the gear cones and engaging the clutches.

However, there may be instances wherein it would be desirable to employ the remote control, such as for increased efficiency in a smaller type machine, in which the loads for shifting the gear cones and engaging the clutches are such that it is not necessary to employ an outside source of power for so doing, and in these instances a mechanical connection can be employed between the control lever and the preselecting and speed changing mechanism and the main control clutch of the machine for directly and manually shifting the same upon movement of the control lever.

A modified construction employing a mechanical connection between the control lever 95 and the spools and main control clutch has been illustrated in Figs. 26, 27 and 28, it being noted that the shafts 92, 93 with the levers 100 and 105 secured thereto are identical with the construction utilizing the fluid pressure motors. The operative connections between the control lever 95 and the shafts 92 and 93 for rocking the latter are also the same in the mechanical modification as in the fluid pressure construction previously explained.

The lever 100 is pivotally connected to one end of a rod 146 which extends through openings in the bed and outwardly of the rear side thereof a substantial distance. The rear end of the rod 146 is pivotally connected to a lever 147 fixed to the lower end of a vertically extending rockable shaft 148 which is supported in a tubular extension 149 depending from the head of the machine. The shaft 148 extends through the head and outwardly of the upper side of the cover 35ᵇ, and has secured to its upper end a lever 150 which is pivotally connected at its outer end to one end of a link 151, the other end of which is pivotally connected to the lever 58ᵉ fixed to the upper end of the vertical shaft 58ᶜ that carries the equalizer bar 58ᵈ for moving the spools inwardly and outwardly.

The lever 105 is pivotally connected to one end of a rod 152 which extends through openings in the bed and a substantial distance outwardly of the rear side thereof and has its rear end pivotally connected to a lever 153, in turn secured to the lower end of a vertically extending shaft 154 which is supported in a tubular extension 155 depending from the head. The shaft 154 extends through the head and above the cover 35ᵇ thereof and has secured to its upper end a lever 156. The outer end of the lever 156 is pivotally connected to one end of a link 157, which has its opposite end pivotally connected to the lever 47ᵃ that is fixed to the upper end of the shaft 47 which actuates the main control clutch shifting yoke 45.

The operation of the machine and particularly the preselecting and speed changing mechanism controlled from the remote point will now be explained. Assuming that the friction clutches for the spindle drive are disengaged with the clutch shifting member in neutral and that the front two-step gear cone is disconnected from the spindle and a new work piece is mounted on the spindle and the spools are in their most inward position, the control lever 95 will be in position N in Fig. 15 and in the full line position shown in Fig. 16. It will be understood that the pins 60ᵇ have been set in the dial 60, in accordance with the spindle speeds required for the different operative steps in the complete cycle, and it will also be understood that at this time the stop pin 61 has been moved outwardly to its inactive position as shown in Fig. 14. Likewise, it will be understood that the operative cycle includes four operations and that the stop rod 68 is positioned as shown in Figs. 8 and 9, as is also the wedge bar 71.

In order to start the operative cycle the operator moves the control lever 95 in a plane parallel to the ways to rock the shaft 92 from the full line position in Fig. 16 to position G to bring the spools outwardly until the projections thereon clear the pins 51ᵃ, 51ᵇ and 52ᵃ, and he then continues the movement of the control lever in the same plane from position G to position F to effect engagement of the clutch member in the drive to the indexing shaft 55. If the clutch shown in Fig. 6 and comprising the clutch members 70 and 81 is employed, the operator holds the lever 95 in position F until the first pin 60ᵇ on the dial has engaged the stop pin 61, which it will be remembered has been moved into operative position A by notch bar 64 through the pawl 69ᵃ when the spools were moved outwardly during movement of the lever from the full line position to position G. As soon as the pin 60ᵇ engages the stop pin 61 in operative position A, a slippage will take place between clutch member 81 and friction ring 80ᵃ, but as soon as the operator moves the lever 95 from position F in Fig. 16 to position G, the clutch will be disengaged. The machine is now preset for shifting into the first predetermined spindle speed. The operator may now move the control lever 95 while in position G, as viewed in Fig. 16, transversely of the ways from position N, as viewed in Fig. 15 toward the forward or full line position to partially engage the main friction clutch for forward drive and to set the gear train in the spindle drive in operation. He then quickly returns the control lever to its former position, namely, position N, as viewed in Fig. 15, and again moves the lever in a plane parallel to the ways from position G to the full line position as viewed in Fig. 16 to engage the front two-step gear cone with the spindle, and to shift the other gear cones if necessary to obtain the predetermined and preselected first operative speed for the spindle. He then moves the lever 95 in the transverse direction from position N in Fig. 15 to the full line position, to fully engage the spindle drive clutch for forward operation of the spindle. The machine is now operating at the first spindle speed and the operator may engage the tools with the work to perform the first operation in the cycle.

While the work is being performed during the first step the operator, while remaining in his position adjacent the apron of the cross-slide, will preselect the spindle speed for the next operative step in the cycle by moving the lever 95 while in position for the forward spindle drive in a plane parallel to the ways, from the full line position shown in Fig. 16, first to position G to bring the projections on the spools away from the shifting pins and to effect a movement of the stop pin 61 from operative position A to operative position B, after which he continues the movement of the control lever in the same plane from position G to position F to engage the clutch controlling the operation of the indexing shaft 55, whereupon said spools and dial are rotated until another of the pins 60ᵇ comes into engagement with the stop pin 61 in position B and arrests further movement of the dial, spools and shaft, it being remembered that at this time a slippage takes place in the clutch until the lever is brought from position F to position G as shown in Fig. 16.

It will be understood that the shifting movements in the plane parallel to the ways just referred to, of the control lever 95 from the full line position to positions G and F in Fig. 16 have no effect upon the shaft 93, and hence do not affect the friction clutches for the spindle drive and the spindle continues in forward operation. It will further be understood that the relative positions of the gear cones and the spindle drive have not been altered by the presetting movements of the control lever 95, since the spring points previously referred to maintain the levers 50, 52 and 63 in position.

As soon as the first operation in the cycle has been completed and it is desired to continue into the second operation, at the preselected spindle speed, the operator shifts the control lever transversely to the ways from the full line position to position N, as shown in Fig. 15, to disengage the main clutch and then immediately moves the lever in a plane parallel to the ways from position G to the full line position of Fig. 16 to bring the spools inwardly to effect a shifting of the gear cones to obtain the preselected speed, it being understood that said gear cones are still coasting after the friction clutch is disengaged by movement of the lever to position N previously referred to. The operator having brought the spools inwardly to shift the gear cones now moves the lever 95 transversely to the ways from position N into the full line position shown in Fig. 15 to again engage the friction clutch for forward operation of the spindle. The operator may proceed in a similar manner to preselect and change the spindle speeds for the third and fourth operations in the cycle.

Assuming that the machine is performing the fourth operation in the cycle, the operator in order to preselect the neutral for the work spindle, that is, the condition when the front two-step gear cone is disconnected from the work spindle for purposes of loading and unloading, moves the lever 95 in a plane parallel to the ways from the full line position in Fig. 16 to position G to move the spools outwardly and to shift the stop pin 61 from position D to position E. He then moves the lever in the same plane from position G to position F to engage the clutch and index the spools and dial, such indexing movement of the spools and dial continuing until the fixed pin 60ᶠ engages the stop pin 61 in position E, whereupon a slippage takes place in the clutch for the indexing shaft 55.

It will be remembered that during the outward movement of the spools the pawl 69 has engaged in the last or right hand notch on the upper side of the notch bar 64 to move said bar to shift the pin 61 from position D to position E and that the pawl 72 stands to the right, as viewed in the drawings, of the right hand notch on the under side of the notch bar 64, that is in an inactive position, and the parts will be in the position shown in Fig. 9.

When the spools and dial have been indexed, as referred to, the operator moves the control lever 95 in the parallel plane from position F to position G, as shown in Fig. 16, which will disengage the clutch for the indexing shaft 55. As soon as the fourth operation has been completed the operator moves the control lever 95 in the transverse direction from the full line position to position N in Fig. 15 to disengage the friction clutch in the spindle drive, and then he quickly shifts the lever 95 in the parallel plane from position G into the full line position in Fig. 16 to disengage the front two-step gear cone from the spindle.

The movement of the lever 95 from position G to the full line position, as just referred to, causes the pawl 69ᵃ to travel upon the wedge bar 71, whereupon the notch bar is released and the spring 65ᵃ moves said bar to its most right hand position as viewed in Fig. 10, with the result that the stop pin 61 is moved from active position E to its inactive position as shown in Fig. 14. The completed work piece may now be unloaded and a new work piece loaded upon the spindle, whereupon a new operative cycle may be carried forward in the same manner.

In case the work piece which has been completed is the last of a series and a different form of work piece is to be operated upon requiring different spindle speeds from those of the first work piece, it will be noted that the stop pin 61 will not now interfere with the rotation of the dial 60, since it is in an inactive position, wherefore as soon as the wedge bar 71 has been adjusted to render the pawl 69ᵃ inactive and the spools have been brought out to clear the shifting pins by a movement of the lever 95 from the full line position to position G, as viewed in Fig. 16, the dial 60 may be freely turned to enable the operator to position the pins 60ᵇ in accordance with the different spindle speeds required in the new operative cycle.

Should the operator desire to do so, in order to test the various spindle speeds upon the first work piece in the new series, he may operate the machine by means of the control lever 95, while the pawl 69ᵃ, notch bar 64 and stop pin 61 are inactive, by manually rotating the dial to preselect the spindle speeds. After the spindle speeds in the new series have thus been determined, the operator may insert the pins 60ᵇ in the dial and withdraw the wedge bar 71 to render the pawl 69ᵃ, notch bar 64 and stop pin 61 active, after which he may operate the machine and employ automatic preselecting of spindle speeds.

The explanation of the operation of the machine hereinbefore given has referred to that form of construction wherein a clutch, such as shown in Figs. 6 and 6ᵃ, is employed for the indexing shaft 55, which clutch must be disengaged by an inward movement of the spools when the control lever is moved from position F to position G, as shown in Fig. 16, after the dial and spools have indexed. The operation of the machine is substantially the same, however, when the one revolution clutch shown in Figs. 6ᵇ, 6ᶜ and 6ᵈ is used, with the exception that as soon as the control lever has moved to position F and the clutch has been engaged, the operator may immediately move the control lever to position G without waiting for the completion of the indexing movement of the spools and dial, it being understood that the clutch is automatically disengaged after one revolution without any attention from the operator.

It will be understood that the movements of the control lever 95 to move the spools inwardly and outwardly and to engage the clutch for the indexing shaft as well as the movement of the control lever for operating the friction clutch in the spindle drive, brings about the movements of the spools and of the friction clutch both when the fluid pressure motors 120 and 121 are employed, or when the mechanical connections between the control lever 95 and the levers 58e and 47a are employed.

From the foregoing description it will be seen that the spindle speeds may be automatically preselected and changed in proper sequence for the operative cycle, and the friction clutch for the spindle drive controlled by the operator by means of a single preselecting and speed changing and clutch controlling lever located at a point remote with respect to the spindle.

In the copending application of Max E. Lange, filed February 26, 1935, Serial No. 8,319, now Patent No. 2,068,552, issued January 19, 1937, there is disclosed a braking mechanism for the spindle drive, wherein the braking resistance is varied in proportion to the speed of rotation of the spindle, the means for varying the braking resistance being co-ordinated with the preselecting and speed changing mechanism. It will be understood that a machine embodying the present invention could be provided with braking mechanism such as shown in said copending Lange application and that the variation of the braking resistance thereof could be controlled by means of the single preselecting and speed changing and clutch controlling lever located at a point remote with respect to the spindle.

Although various embodiments of the invention have been illustrated and described herein, it should be understood that the invention is not to be limited thereto but is susceptible of modification and adaptation within the scope of the appended claims.

Having thus described our invention we claim:

1. In a machine tool having a part to be moved at different speeds for the different operative steps of the cycle, means operable during the movement of said part at one speed for selecting the following speed of said part and for changing the speed thereof to the preselected speed at the end of the operative step, power means for operating said last named means to preselect the speed for said part, a housing for said last named means and for said power means, and a control member operatively connected with said preselecting and speed changing means and remotely arranged with respect to said housing for controlling said preselecting and speed changing means and said power means.

2. In a machine tool having a part to be moved at different speeds for the different operative steps in the cycle, means operable during the movement of said part at one speed for selecting the following speed of said part, power means for operating said last named means to preselect the speed for said part, a housing for said last named means and a control member for controlling said last named means operatively connected therewith and arranged remotely with respect to said housing.

3. In a machine tool having a part to be moved at different speeds for the different operative steps in the cycle, driving means for moving said part, means operable during the movement of said part at one speed for selecting the following speed of said part and for changing the speed thereof at the completion of the operative step to the selected speed, a plurality of separate power means for operating said last named means to preselect the speed of said part, change the speed thereof to the selected speed and control said driving means, and a single control member for controlling all of said power means.

4. In a machine tool having a part to be moved at different speeds for the different operative steps in the cycle, driving means for moving said part, means operable during the movement of said part at one speed for selecting the following speed of said part and for changing the speed thereof at the completion of the operative step to the selected speed, separate power means for operating said last named means to preselect the speed for said part, to operate said last named means to change the speed thereof to the selected speed and to control said driving means, and means for controlling all of said power means and located remotely with respect thereto.

5. In a machine tool having a part to be moved at different speeds, movable means operable during the movement of said part at one speed for preselecting the following speed for said part and including power means for operating said movable means, means for automatically arresting movement of said movable means when the speed has been preselected, and a control member for said power means.

6. In a machine tool having a part to be moved at different speeds in each operative cycle, movable means operable during the movement of said part at one speed for selecting the following speed thereof in the cycle, power means for operating said last named means, and means for automatically and sequentially stopping movement of said movable part in different positions during the operative cycle to preselect the different speeds therein for said movable part, and a control member for said power means.

7. In a machine tool having a part to be moved at different speeds in an operative cycle, movable means operable during the movement of said part at one speed for selecting the following speed of said part in the cycle, power means for operating said movable means, means for automatically and sequentially stopping movement of said movable means to preselect the different speeds of said part in the operative cycle and including transferable locating means, and a control member for said power means.

8. In a machine tool having a part to be moved at different speeds in the operative cycle; movable means operable during the movement of said part at one speed for selecting the following speed of said part; power means for operating said movable means; and means for automatically and sequentially stopping the movement of said movable means to preselect the different speeds in the operative cycle and including transferable locating means, stop means and automatic means for sequentially positioning said stop means; and a control member for controlling said power means.

9. In a machine tool having a part to be moved at different speeds in the operative cycle; movable means operable during the movement of said part at one speed for selecting the following speed of said part; operating means for said last named means; and means for automatically and sequentially stopping movement of said movable means to preselect the different predetermined speeds of said part and including stop means and means automatically operated to sequentially move said stop means step by step through a plurality of active positions and into an inactive position.

10. In a machine tool having a part to be moved at different speeds, driving means for moving said part, means operable during the movement of said part at one speed for selecting the following speed of said part, two separate power means for operating said last named means to preselect the speed of said part and for controlling said driving means, and a single control member for controlling both of said power means.

11. In a machine tool having a part to be moved at different speeds for the different operative steps in the cycle, driving means for moving said part, means operable during the movement of said part at one speed for selecting the following speed of said part and for changing the speed thereof at the completion of the operative step to the selected speed, two separate power means for operating said last named means to preselect the speeds for said part and to operate said last named means to change the speed thereof to the selected speed, and means for controlling both of said power means and located remotely with respect thereto.

12. In a machine tool having a part to be moved at different speeds in the different operative steps in the cycle, movable means operable during the movement of said part at one speed for selecting the following speed of said part, operating means for said last named means, and means for automatically and sequentially stopping movement of said movable means to preselect the different predetermined speeds of said part and including transferable locating pins, a stop pin, and means automatically operated to sequentially move said stop pin step by step through a plurality of active positions wherein it cooperates with said locating pins and into an inactive position.

13. In a machine tool having a part to be moved at different speeds in the operative cycle, movable means operable during the movement of said part at one speed for selecting the following speed of said part, operating means for said last named means, and means for automatically and sequentially stopping movement of said movable means to preselect the different predetermined speeds of said part and including an actuating member and a member cooperating therewith so as to have a step by step movement.

14. In a machine tool having a part to be moved at different speeds in the operative cycle, movable means operable during the movement of said part at one speed for selecting the following speed of said part, operating means for said last named means, and means for automatically and sequentially stopping movement of said movable means to preselect the different predetermined speeds of said part and including an actuating member, a member cooperating therewith to have a step by step movement, and adjustable means for rendering said actuating member active or inactive with respect to said second member.

15. In a machine tool having a part to be moved at different speeds in the operative cycle, movable means operable during the movement of said part at one speed for selecting the following speed of said part, operating means for said last named means, and means for automatically and sequentially stopping movement of said movable means to preselect the different predetermined speeds of said part and including an actuating member, a member cooperating therewith to have a step by step movement in one direction, means acting to urge said second member in the opposite direction, and a member restraining said second member against movement by said last-named means.

16. In a machine tool having a part to be moved at different speeds in the operative cycle, movable means operable during the movement of said part at one speed for selecting the following speed of said part, operating means for said last named means, and means for automatically and sequentially stopping movement of said movable means to preselect the different predetermined speeds of said part and including an actuating member, a second member cooperating therewith to be given a step by step movement thereby in one direction, means tending to urge said second member in the opposite direction, a member for restraining said second member against movement under the action of said last-named means, and means effective after said second member has moved a predetermined distance and operated by said second member for rendering said restraining means inactive.

17. In a machine tool having a part to be moved at different operative speeds for the operative steps in the cycle, movable means operable during the operative movement of said part at one speed for selecting the next operative speed of said part, operating means for said last named means, and means for automatically and sequentially stopping movement of said movable means to preselect the different predetermined operative speeds of said part and including a shiftable pawl, a member cooperating therewith to be given a step by step movement thereby in one direction, a spring tending to urge said member in the opposite direction, a second pawl for restraining said member against movement under the action of said spring, means effective after said member has moved a predetermined distance and operated by said member for rendering said second named pawl inactive, and a second means operable by said member when it is moved by said spring to render said second named pawl active.

18. In a machine tool having a part to be moved at different speeds, driving means for moving said part, speed changing means for said part, a housing for said speed changing means, a shaft operatively connected with said driving means for controlling the same, a second shaft operatively connected to said speed changing means for actuating the same, a single manual control member located at a point remote with respect to said housing and having an operative connection with both of said shafts such that movement of said member in one direction moves one of the shafts while movement of said member in another direction moves the other of the shafts.

19. In a machine tool having a part to be moved at different speeds, driving means for moving said part, speed changing means for said part including a device for preselecting the different speeds of said part, a housing for said speed changing means, a shaft operatively connected with said driving means for controlling the same, a shaft operatively connected with said device for actuating the same, and a single control member having an operative connection with said shafts at a point remote with respect to said housing and such that movement of said member in one direction actuates one of said shafts to control said driving means and movement of said member in another direction actuates the other of said shafts to control said device.

20. In a machine tool having a part to be moved at different speeds, driving means for moving said part, speed changing means for said part including a device for preselecting the different speeds of said part and for changing to the preselected speed, a housing for said speed changing means, a shaft operatively connected with said driving means for controlling the same, a shaft operatively connected with said speed changing means for actuating said device, a single control member having an operative connection with both of said shafts at a point remote with respect to said housing and such that movement of said member in one direction actuates one of the shafts to control said driving means and movement of said member in another direction actuates the other of said shafts to control said device to preselect and change to the different speeds of said part.

21. In a machine tool having a part to be moved at different speeds, driving means for moving said part, speed changing means for said part including a device for preselecting the different speeds of said part and for changing to the preselected speed, a housing for said speed changing means, a shaft operatively connected with said driving means for controlling the same, a shaft operatively connected with said device for actuating the same, and a single control member having an operative connection with said shafts at a point remote with respect to said housing and movable in different planes, the movement of said member in one plane actuating one of said shafts to control said driving means and the movement of said member in another plane actuating the other of said shafts to first preselect a different speed for said part and then to change said speed changing means to effect the preselected speed.

22. In a machine tool having a part to be moved at different speeds, means for starting, stopping and reversing the movement of said part, speed changing means for said part including a device for preselecting the different speeds of said part and for changing to the preselected speeds, a housing for said speed changing means, a shaft operatively connected to said first named means for controlling the same, a shaft operatively connected with said device for actuating the same, and a single control member having an operative connection with both of said shafts at a point remote with respect to said housing and movable in different planes, the movement of said member in one plane actuating one of said shafts to control the starting, stopping and reversing of said part and the movement of said member in another plane actuating said device.

23. In a machine tool having a part to be moved at different speeds, driving means for moving said part, a speed changing means for said part, a housing for said speed changing means, a shaft operatively connected with said driving means for controlling the same, a shaft operatively connected with said speed changing means for controlling the same, separate levers secured to said shafts, and a single control member having an operative connection with said levers at a point remote with respect to said housing and movable in one plane to actuate one of said levers and movable in another plane to actuate the other of said levers.

24. In a machine tool having a movable part; means for controlling the movement of said part; a fluid motor for actuating said means and having a primary piston and a secondary piston movable to different positions to control the amplitude of movement of said primary piston; a pair of valves for controlling the movements of said pistons, and a single control member operatively connected with said valves to move the same in unison to effect a plurality of movements of said primary piston in the same direction.

25. In a machine tool having a part to be moved at different speeds, means for controlling the rate of movement of said part, means for controlling the direction of movement of said part, fluid motors operatively connected with both of said means and each having a primary piston and a secondary piston movable to different positions to limit the amplitude of movement of the primary piston, a pair of control valves for each fluid motor, a single control member operatively connected with each pair of control valves to move the valves of each pair in unison, said member being movable in one plane to move one pair of control valves to control one of said fluid motors and movable in another plane to control the other pair of control valves to control the other of said fluid motors.

26. In a machine tool having a part to be moved at different speeds, means for controlling the rate of movement of said part, means for controlling the direction of movement of said part, fluid motors for controlling both of said means, valve means for controlling each of said fluid motors, and a single control member operatively connected with said valve means and movable in one plane to control one of said fluid motors and movable in another plane to control the other of said fluid motors.

27. In a machine tool having a part to be moved at different speeds, means for controlling the rate of movement of said part, means for controlling the direction of movement of said part, fluid motors for controlling both of said means and including primary and secondary pistons, valve means for each of said motors and controlling the movements of said primary and secondary pistons, and a single control member for said valve means and movable in different planes for controlling the same, the successive movement of said member in one plane acting to impart successive movements in the same direction to the primary piston of one of the fluid motors while successive movements of said member in another plane acts to impart successive movements in the same direction to the primary piston of the other of said motors.

28. In a machine tool having a part to be moved, means for controlling the movement of said part, a fluid motor for actuating said means and having a primary piston and a secondary piston movable to different positions to regulate the amplitude of movement of said primary piston, a pair of control valves movable in unison for controlling said primary and secondary pistons, and a control member for moving said valves, said valves being provided with means whereby the first part of the movement thereof causes a partial movement of said primary piston while the remainder of the movement of said valves in the same direction causes an additional movement of said primary piston in the same direction.

29. In a machine tool having a part to be moved at different speeds, speed changing means for said part including a device for preselecting the speed of movement thereof, power means for operating said device and including a one rotation clutch, and a control member for engaging said clutch to initiate the rotation thereof to actuate said preselecting device.

30. In a machine tool having a part to be moved at different speeds, driving means for said part, speed changing means for said part and including a device for preselecting the speed of movement thereof, a housing for said speed changing means, a shaft for controlling said driving means, a shaft for controlling said device, mechanical means operatively connecting said shafts, said driving means and said device, respectively, and a single control means having an operative connection with said shafts at a point remote with respect to said housing and movable in one plane to actuate one of said shafts to actuate said driving means and movable in another plane to operate the other of said shafts to actuate said device.

31. In a machine tool having a part to be moved at different speeds, driving means for said part, speed changing means for said part and including a device for preselecting the speed of movement thereof, a slide, a shaft for controlling said driving means, a shaft for actuating said device, mechanical means operatively connecting said shafts, said driving means and said device, respectively, and a single control member carried by said slide and operatively connected with said shafts and movable in one plane to actuate one of said shafts to control said driving means and movable in another plane to actuate the other of said shafts to control said device.

32. In a machine tool having a head and a slide, a spindle rotatable at different speeds, driving means for rotating said spindle, speed changing means for said spindle located in said head and including a movable device for preselecting during one operative step of the complete work cycle the speed of rotation of said spindle for the following operative step of the cycle and for actuating the speed changing means to obtain said preselected speed, and a single control member operatively connected with said device and with said driving means for controlling the same and carried by said slide.

33. In a machine tool having a part to be moved at different speeds during the operative steps in the cycle, movable means operable during the movement of said part at one speed for selecting the following speed of said part, operating means for said last named means, and means for automatically and sequentially stopping movement of said movable means to preselect the different predetermined speeds of said part and including an actuating pawl and a notch bar cooperating therewith so as to have a step by step movement.

34. In a machine tool having a part to be moved at different speeds in the operative cycle, movable means operable during the movement of said part at one speed for selecting the following speed of said part, operating means for said last named means, and means for automatically and sequentially stopping movement of said movable means to preselect the different predetermined speeds of said part and including an actuating pawl, a member cooperating with said pawl to be given a step by step movement thereby in one direction, means tending to urge said member in the opposite direction, and a second pawl for restraining said member against movement under the action of said last named means.

35. In a machine tool having a part to be moved at different speeds, speed changing means for said part including a device for preselecting during one operative step of the complete work cycle the speed of said part for the following operative step of the cycle and for changing to the preselected speeds, a housing for said speed changing means, a shaft operatively connected with said device for actuating the same, and a manual control member for said device located at a point remote with respect to said housing and having a slidable operative connection with said shaft.

36. In a machine tool having a part to be moved at different speeds, speed changing means for said part including a device for preselecting the different speeds of rotation of said part and for changing the speed thereof to the preselected speed, power means for operating said preselecting device, a housing for said speed changing means and said power means, a shaft operatively connected with said device and said power means for controlling the same, and a manual control member for said device and said power means located at a point remote with respect to said housing and having an operative connection with said shaft.

37. In a machine tool having a part to be moved at different speeds for the operative steps in the cycle, movable means operable during the movement of said part at one speed for selecting the following speed of said part, operating means for said last named means, and means for automatically and sequentially stopping movement of said movable means to preselect the different predetermined speeds for the operative steps and including an actuating member, a member cooperating therewith to have a step by step movement, and adjustable means for varying the number of steps in the movement of said second named member in accordance with the number of operative steps in the cycle.

38. In a machine tool having a part to be moved at different speeds for the operative steps in the cycle, movable means operable during the movement of said part at one speed for selecting the following speed of said part, operating means for said last named means, and means for automatically and sequentially stopping movement of said movable means to preselect the different predetermined speeds of said part and including transferable locating pins, a stop pin, means automatically operated to sequentially move said stop pin step by step through a plurality of active positions wherein it cooperates with said locating pins, and adjustable means for varying the number of steps in the movement of said stop pin wherefore the number of active positions thereof will correspond to the number of operative steps in the cycle.

39. In a machine tool having a part to be moved, driving means for moving said part, gear means for connecting and disconnecting said part with said driving means, a housing for said gear means, a device movable to preset it for disconnecting said gear means with respect to said part and then movable to effect said disconnection, and a control member for controlling said device and remotely arranged with respect to said housing.

40. In a machine tool having a part to be moved at different speeds, means for controlling the rate of movement of said part, means for controlling the direction of movement of said part, a shaft operatively connected with said first named means for controlling the same, a shaft operatively connected with said second named means for controlling the same, each of said shafts being provided with a lever, a shiftable member, one of said levers having an operative connection with said shiftable member, and a link operatively connecting said shiftable member with the other of said levers, one of said shafts being operated by the movement of said first named lever in one direction and the other of said shafts being operated by the movement of said first named lever and shiftable member in another direction.

41. In a machine tool having a movable part, means for controlling the movement of said part, a fluid motor for actuating said means and having a primary piston and a secondary piston movable to different positions to control the amplitude of movement of said primary piston, valve means for controlling the movements of said pistons, and a single means operatively connected with said valve means for controlling the same so as to effect a plurality of movements of said primary piston in the same direction.

42. In a machine tool having a part to be moved at different speeds in each operative cycle, movable means operable during the movement of said part at one speed for selecting the following speed thereof in the cycle, means for operating said last named means, and means for automatically and sequentially stopping movement of said movable means in different positions during the operative cycle to preselect the different speeds thereof for said movable part.

43. In a machine tool having a part to be moved at different speeds in an operative cycle, movable means operable during the movement of said part at one speed for selecting the following speed of said part in the cycle, means for operating said movable means, and means for automatically and sequentially stopping movement of said movable means to preselect the different speeds of said part in the operative cycle and including transferable locating means.

44. In a machine tool having a part to be moved at different speeds in the operative cycle, movable means operable during the movement of said part at one speed for selecting the following speed of said part, means for operating said movable means, and means for automatically and sequentially stopping the movement of said movable means to preselect the different speeds in the operative cycle and including stop means and automatic means for sequentially positioning said stop means.

45. In a machine tool having a part to be moved at different speeds in the operative cycle, movable means operable during the movement of said part at one speed for selecting the following speed of said part and including abutment members, stop means and means automatically operated to sequentially move said stop means step by step through a plurality of active positions and into inactive position.

46. In a machine tool having a part to be moved at different speeds, stop means, means automatically operated to sequentially move said stop means to positions related to the speeds of said part, and speed changing means including abutment members which cooperate with said stop means in the different positions to which it has been moved.

47. In a machine tool having a part to be moved at a predetermined number of different speeds, stop means, means automatically operated to sequentially move said stop means to different positions related to the different speeds of said part and including means for limiting the sequential movement of said stop means in accordance with the number of speeds of said part and for restoring said stop means to its initial position after the predetermined number of speeds have been imparted to said part, and speed changing means including abutment members cooperating with said stop means to obtain said different speeds.

48. In a machine tool having a part to be moved at different speeds, stop means, means automatically operated to sequentially move said stop means to positions related to the speeds of said part and to an inactive position, and speed changing means including abutment members which cooperate with said stop means in the different positions to which it has been moved.

49. In a machine tool having a part to be moved at different speeds in the different operative steps of the complete work cycle, stop means, means automatically operated to sequentially move said stop means to a plurality of positions related to the different speeds of said part for the various operative steps of the cycle, and speed changing means including abutment members cooperating with said stop means in the different positions to which it has been moved to obtain the required speeds for said part.

50. In a machine tool having a part to be moved at different speeds in the different operative steps of a work cycle, stop means, means automatically operated to sequentially move said stop means to a plurality of positions related to the different steps in the cycle, means for regulating said last named means so as to move said stop means to a predetermined number of different positions corresponding to the number of operative steps constituting the work cycle, and speed changing means including abutment members cooperating with said stop means whereby the desired speed for each step is obtained.

51. In a machine tool having a part to be moved at different speeds in the operative cycle, movable means operable during the movement of said part at one speed for selecting the following speed of said part and including abutment members, and stop means cooperating with said abutment members to stop the movement of said movable means in certain predetermined positions correlated to different speeds of said movable part.

52. In a machine tool having a part to be moved at different speeds in the operative cycle, movable means operable during the movement of said part at one speed for selecting the following speed of said part and including a rotatable element provided with abutment members, and stop means cooperating with said abutment members to stop the rotation of said element in different positions correlated to different speeds of said movable part.

53. In a machine tool having a part to be moved at different speeds in the operative cycle, movable means operable during the movement of said part at one speed for selecting the following speed of said part and including abutment members, and stop means movable to different cooperative positions with respect to said abutment members for stopping movement of said movable means in different positions correlated to the different speeds of said movable part in the operative cycle.

54. In a machine tool having a part to be moved at different speeds in the operative cycle, movable means operable during the movement of said part at one speed for selecting the following speed of said part and including a rotatable element provided with abutment members, and stop means movable sequentially step by step through a plurality of positions wherein said stop means cooperates with said abutment members to stop the rotation of said element in various positions correlated with respect to the different speeds of said movable part.

55. In a machine tool having a bed and a part to be moved at different speeds, driving means for moving said part, speed changing means for said part including a device movable in one direction for preselecting during one operative step of the work cycle the speed of said part for the following operative step thereof and movable in another direction for obtaining the preselected speed, a housing for said speed changing means, a control member for controlling the movement of said device in the last named direction and operatively connected therewith and arranged remotely with respect to said housing, and a slide on said bed intermediate said control member and said housing.

56. In a machine tool having a bed and a part to be moved at different speeds, driving means for moving said part, speed changing means for said part including a device movable in one direction for preselecting during one operative step of the complete work cycle the speed of said part for the following operative step of the cycle and movable in another direction for actuating said speed changing means to obtain said preselected speed, a housing for said speed changing means, a control member for controlling the last named movement of said device and operatively connected therewith and remotely arranged with respect to said housing, and a slide on said bed and intermediate said housing and said control member.

57. In a machine tool having a bed and a part to be moved at different speeds, driving means for moving said part, speed changing means for said part including a device movable in one direction for preselecting during one operative step of the complete work cycle the speed of said part for the following operative step of the cycle and movable in another direction for obtaining the preselected speed, a housing for said speed changing means, a single control member operatively connected with the said device and said driving means for controlling the last named movement of said device and for controlling said driving means and remotely arranged with respect to said housing, and a slide on said bed intermediate said control member and said housing.

58. In a machine tool having a bed and a part to be moved at different speeds, driving means for moving said part, speed changing means for said part including a device movable in one direction for preselecting during one operative step of the complete work cycle the speed of said part for the following operative step of the cycle, and movable in another direction for actuating said speed changing means to obtain said preselected speed, a housing for said speed changing means, a single control member operatively connected with said device and said driving means for controlling the last named movement of said device and for controlling said driving means and remotely arranged with respect to said housing, and a slide on said bed intermediate said control member and said housing.

59. In a machine tool having a plurality of movable parts one of which is to be moved at different speeds, driving means for moving said last named part, speed changing means for said last named part including a device movable in one direction for preselecting during one operative step of the complete work cycle the speed of the said part for the following operative step of the cycle and movable in another direction for obtaining the preselected speed, and a control member operatively connected with said device for controlling the last named movement of the same and located remotely thereof on another of the movable parts of said machine.

60. In a machine tool having two movable parts one of which is to be moved at different speeds, driving means for moving said last named part, speed changing means for said last named part including a device movable in one direction for preselecting during one operative step of the complete work cycle the speed of said last named part for the following operative step and movable in another direction for actuating the speed changing means to obtain said preselected speed, and a single control member operatively connected with said device and with said driving means for controlling the last named movement of said device and for controlling said driving means and located remotely thereof on the other of said movable parts.

61. In a machine tool having a spindle rotatable at different speeds and a slide relatively movable toward and away from said spindle, speed changing means for said spindle including a device movable in one direction for preselecting during one operative step of the complete work cycle the speed of rotation of said spindle for the following operative step of the cycle and movable in another direction for actuating the speed changing means to obtain said preselected speed, and a control member operatively connected with said device for controlling the last named movement of the same and remotely arranged with respect to said device and carried by said slide.

62. In a machine tool having a spindle to be rotated at different speeds and a slide provided with an apron, speed changing means for said spindle including a device movable in one direction for preselecting during one operative step of the complete work cycle the speed of the spindle for the following operative step of the cycle, and movable in another direction for actuating the speed changing means to obtain said preselected speed, and a control member located on the apron of said slide and operatively connected with said device for controlling the last named movement of the same.

63. In a machine tool having a spindle to be rotated at different speeds and a pair of slides, speed changing means for said spindle including a device movable in one direction for preselecting during one operative step of the complete work cycle the speed of rotation of the spindle for the following operative step of the cycle and movable in another direction for actuating the speed changing means to obtain said preselected speed, and a control member arranged on said machine intermediate said slides and operatively connected with said device for controlling the last named movement of the latter.

64. In a machine tool having a head and a slide support, a spindle carried by said head and rotatable at different speeds, speed changing means for said spindle including a device movable in one direction for preselecting during one operative step of the complete work cycle the speed of rotation of the spindle for the following operative step of the cycle and movable in another direction to obtain the preselected speed, a manual control member operatively connected with said device for controlling the last named movement of the same and remotely arranged with respect to said head, and a slide on said support intermediate said control member and said head.

65. In a machine tool having two movable parts, one of said parts being supported in a head and rotatable at different speeds, driving means for rotating said last named part, speed changing means for said last named part including a device movable in one direction for preselecting during one operative step of the complete work cycle the speed of rotation of said part for the following operative step of the cycle and movable in another direction for obtaining the preselected speed, and a manual control member operatively connected with said device for controlling the last named movement thereof and remotely arranged with respect to said head and located on the other movable part.

66. In a machine tool having a head and a slide, a spindle rotatable at different speeds, speed changing means for said spindle located in said head and including a device movable in one direction during one operative step of the complete work cycle for preselecting the speed of rotation of said part for the following operative step of the cycle and movable in another direction for obtaining the preselected speed, and a control member operatively connected with said device for controlling the last named movement thereof and carried by said slide.

67. In a machine tool having a head and a slide, a spindle rotatable at different speeds, speed changing means for said spindle located in said head and including a device movable in one direction during one operative step of the complete work cycle for preselecting the speed of rotation of said spindle for the following operative step of the cycle and movable in another direction for actuating the speed changing means to obtain said preselected speed, and a control member operatively connected with said device for controlling the last named movement thereof and carried by said slide.

MAX E. LANGE.
JOHN J. N. VAN HAMERSVELD.